(12) United States Patent
Yee et al.

(10) Patent No.: US 8,151,349 B1
(45) Date of Patent: Apr. 3, 2012

(54) MASKING MECHANISM THAT FACILITATES SAFELY EXECUTING UNTRUSTED NATIVE CODE

(75) Inventors: Bennet S. Yee, Mountain View, CA (US); J. Bradley Chen, Los Gatos, CA (US); David C. Sehr, Cupertino, CA (US)

(73) Assignee: Google Inc., Mountain View, CA (US)

( * ) Notice: Subject to any disclaimer, the term of this patent is extended or adjusted under 35 U.S.C. 154(b) by 682 days.

(21) Appl. No.: 12/202,103

(22) Filed: Aug. 29, 2008

Related U.S. Application Data

(60) Provisional application No. 61/082,470, filed on Jul. 21, 2008.

(51) Int. Cl.
*G06F 12/14* (2006.01)
*H04L 9/32* (2006.01)

(52) U.S. Cl. .......... 726/22; 713/162; 713/165; 713/189; 713/190

(58) Field of Classification Search .................. 726/22; 713/162, 165, 189, 190
See application file for complete search history.

(56) References Cited

U.S. PATENT DOCUMENTS

| | | | | |
|---|---|---|---|---|
| 6,578,080 B1 * | 6/2003 | Dwork | ........................... | 709/229 |
| 7,206,916 B2 * | 4/2007 | Estlick et al. | ................. | 711/207 |
| 2004/0249757 A1 * | 12/2004 | Walmsley et al. | ............... | 705/52 |
| 2006/0117229 A1 * | 6/2006 | Swaine et al. | .................. | 714/45 |
| 2006/0174077 A1 | 8/2006 | Abadi | | |
| 2007/0271442 A1 * | 11/2007 | Shaw et al. | .................... | 712/202 |

OTHER PUBLICATIONS

U. Erlingsson, M. Abadi, M. Veable, M. Budiu, and G. Necula, XFI: Software guards for system address spaces. In OSDI '06: 7th Symposium on Operating Systems Design and Implementation, pp. 75-88, Nov. 2006.
B. Ford, VXA: A virtual architecture for durable compressed archives. In USENIX File and Storage Technologies, Dec. 2005.
S. McCamant and G. Morrisett, Evaluating SFI for a CISC architecture. In 15th USENIX Security Symposium, pp. 1-16, Aug. 2006.
G. Necula, Proof carrying code. In Principles of Programming Languages, pp. 1-14, 1997.
V. Prasad, W. Cohen, FC Eigler, M. Hunt, J. Keniston, and JB Chen, Locating system problems using dynamic instrumentation, in 2005 Ottawa Linux Symposium, pp. 49-64, Jul. 2005.
Robert Wahbe, Steven Lucco, Thomas E. Anderson, and Susan L. Graham, Efficient software-based fault isolation, ACM SIGOPS Operating Systems Review, 27(5):203-216, Dec. 1993.

* cited by examiner

*Primary Examiner* — Aravind Moorthy
(74) *Attorney, Agent, or Firm* — Fish & Richardson P.C.

(57) ABSTRACT

This disclosure presents a system that uses masking to safely execute native code. This system includes a processing element that executes the native code and a memory which stores code and data for the processing element. The processing element includes a masking mechanism that masks one or more bits of a target address during a control flow transfer to transfer control to a restricted set of aligned byte boundaries in the native code.

20 Claims, 15 Drawing Sheets

NATIVE CODE MODULE
PSEUDO CALL
INSTRUCTION
200

```
andl R, TSAFETY_MASK
orl R, TEXT_BASE
call *R
```

NATIVE CODE MODULE
PSEUDO JUMP
INSTRUCTION
202

```
andl R, TSAFETY_MASK
orl R, TEXT_BASE
jmp *R
```

EXEMPLARY PSEUDO
CALL INSTRUCTION
WITH MASK VALUES
204

```
andl R, 0x000fffe0
orl R, 0x00100000
call *R
```

MASKING MECHANISM THAT FACILITATES SAFELY EXECUTING UNTRUSTED NATIVE CODE

RELATED APPLICATION

This application hereby claims priority under 35 U.S.C. section 119(e) to U.S. Provisional Application Ser. No. 61/082,470, entitled "Using a Masking Mechanism to Facilitate Safely Executing an Untrusted Native Code Module," by inventors Bennet S. Yee, J. Bradley Chen, and David C. Sehr, filed on 21 Jul. 2008, the contents of which are herein incorporated by reference.

BACKGROUND

1. Field

The described embodiments generally relate to techniques for providing computer security.

2. Related Art

Easy access to computers and plentiful network bandwidth have made it very easy to share information and applications. For instance, a user can easily install and execute an application which is downloaded from a web site or received from a friend as an email attachment. However, installing and executing such applications on a computing device involves a level of trust. For example, because such applications are generally executed with inadequate security mechanisms, a user must implicitly trust that the application does not include any malicious code. Some applications exploit this blind trust, however, by including "viruses" that can damage or erase information on the computing device, and can propagate themselves to other vulnerable devices on the network.

Some techniques have been developed to mitigate the negative impacts of viruses. For instance, some interpreted languages reduce the risk involved in executing unknown code by limiting the ability of a programmer to specify unsafe operations. Moreover, some virtual machine execution environments isolate untrusted applications to their own virtual machines to reduce security risks. Although the above-described approaches can effectively provide a level of security, they suffer from a significant performance disadvantage in comparison to executing native code directly on the native architecture of a processor.

SUMMARY

This disclosure presents a system that uses masking to safely execute native code. This system includes a processing element that executes the native code and a memory which stores code and data for the processing element. The processing element includes a masking mechanism that masks one or more bits of a target address during a control flow transfer to transfer control to a restricted set of aligned byte boundaries in the native code.

In some embodiments, the masking mechanism is configured to mask the one or more lower-order bits to ensure that the target address of a control flow instruction falls on an aligned byte boundary.

The system can also include a secure runtime environment which enforces code integrity, control flow integrity, and data integrity for native code executing on the processing element. This secure runtime environment is configured to access a user-level control register, which enables and/or disables the masking mechanism, to enforce target address alignment for control flow instructions in the native code.

This secure runtime environment can also include a validation mechanism configured to validate that; (1) instructions in the native code are located on aligned byte boundaries; (2) control flow instructions in the native code have targets which fall on aligned byte boundaries; and (3) instructions in the native code do not configure and/or disable the masking mechanism.

In some embodiments, the masking mechanism includes a control register that specifies the one or more bits to be masked.

In some embodiments, the masking mechanism is configured to change a granularity of alignment by setting specific bits to be masked in the control register.

In some embodiments, the one or more bits which are masked in the target address are masked to zero values.

The system can also include a web browser configured to download and execute native code on the processing element.

In some embodiments, the masking mechanism is configured to mask the target address for a subset of control transfer instructions. In these embodiments, the masking mechanism determines whether to mask the target address of a control flow instruction based on an instruction opcode and/or a type of address encoding for the control flow instruction.

DETAILED DESCRIPTION

Figure 1:
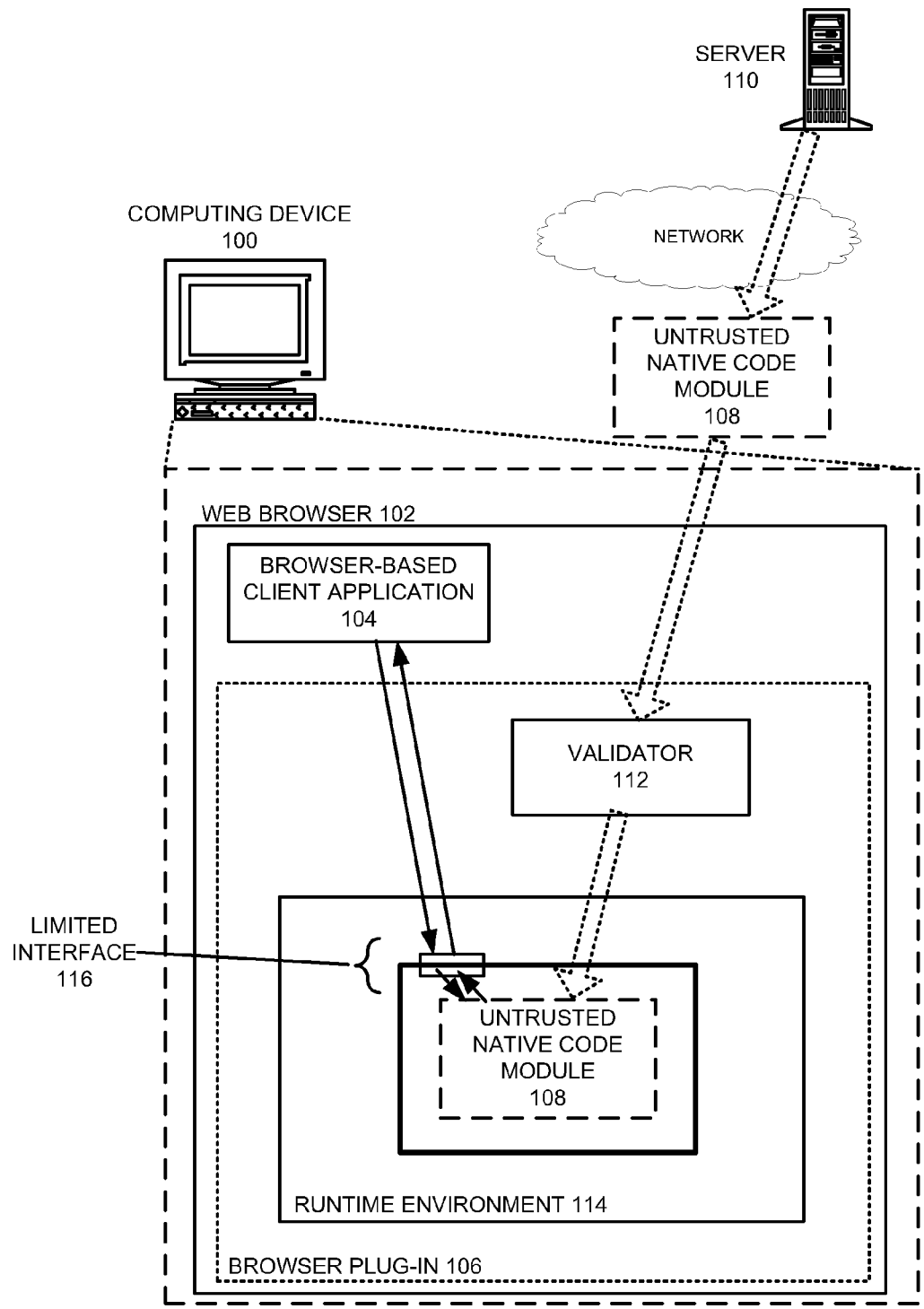
FIG. 1 illustrates the execution of untrusted native code.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the various embodiments are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer systems perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

1. Issues in Executing Untrusted Code

The following sections describe embodiments that facilitate executing an untrusted (and potentially malicious) native code module safely and securely on a substantially similar set of hardware. These embodiments protect the host process and the rest of the host device from malicious behavior by the untrusted module while providing performance which is substantially similar to native code performance. More specifically, these embodiments allow untrusted native code to be safely executed on a computing device by first performing a set of validation checks on the untrusted module to ensure data integrity and control flow integrity are maintained by the untrusted module. After these validation checks, the untrusted module is executed in a secure runtime environment that provides secure, moderated access to system resources. These techniques allow users to execute downloaded code without fear of executing malicious code that can compromise the security of the computing device.

2. System Overview

The embodiments described below provide a system that safely runs untrusted native code on a computing device with performance substantially similar to trusted native code. This system can include one or more software and/or hardware mechanisms in the computing device that work together to ensure that untrusted native code modules cannot behave maliciously. One mechanism in this system verifies that the native code in an untrusted native code module has data integrity, control flow integrity, and has been written in a restricted ("safe") subset of the instruction set for the computing device. These properties, which are typically enabled for an untrusted native code module at compile time, are validated by this validation mechanism when the system loads the untrusted native code module into a second mechanism which provides a secure runtime environment for the untrusted native code module.

During execution, this secure runtime environment provides moderated access to system resources, and restricts the resource accesses of the untrusted native code module as specified by a security policy (which may be determined by and/or associated with an organization, a computing device, an application, a user, and/or some other entity). The system ensures that the untrusted native code module can only access common system resources (e.g., communications with other local processes, durable storage, etc.) via the secure runtime environment. Note that while the native code module is executed in a secure runtime environment, the instructions in a validated native code module run directly on the hardware of the computing device itself, and do not involve emulation, virtualization, or interpretation.

FIG. 1 illustrates the execution of an untrusted native code module in one embodiment of the above-described system. During operation, a user performing operations in web browser 102 on computing device 100 accesses a web page, and invokes browser-based client application 104. Browser-based client application 104 causes browser plug-in 106 to download untrusted native code module 108 from network server 110. Note that untrusted native code module 108 is validated by validator 112 as it is loaded into secure runtime environment 114. If validator 112 determines that untrusted native code module 108 is not compliant with a set of validation rules, the module is rejected (and hence not executed). Otherwise, if untrusted native code module 108 passes validation, it can be safely executed in secure runtime environment 114. During execution, secure runtime environment 114 provides a very limited interface 116 between the untrusted native code module 108 and other software entities and hardware resources, moderating all external requests made by untrusted native code module 108 (as well as the way in which these requests are made).

The embodiment illustrated in FIG. 1 executes untrusted native code modules in a web browser, thereby allowing untrusted native code to be safely run as an alternative (or complement) to a JavaScript front-end for a performance-sensitive web-based application (e.g., a game with compute-intensive physics modeling). In this scenario, the system can close the performance and functionality gap between web-based applications and 'native' or 'console' applications, thereby enabling enhanced web-based applications with less risk of viruses, worms, spyware, and other related software security defects.

Note, however, that the described techniques are not limited to web browsers, and can be used anywhere that native-code performance and an additional level of security are needed for all or part of an untrusted application. For instance, the described techniques can be used to: execute and/or extend untrusted stand-alone applications; allow user enhancement of specialized environments such as game consoles, where allowing users to extend application functionality in a protected (but high-performance) manner may be desirable; safely execute email attachments; safely execute untrusted native code in a server-side application; and enhance scripting environments by safely using native code to speed up critical and/or compute-intensive code sections.

Some embodiments of the system allow safe execution of an untrusted binary code module on a computing device, thereby enabling the module to serve as an application component that achieves native performance but is structurally immune from security problems such as viruses. Such binary modules are operating-system independent, and hence are portable across various operating systems. Note that the binary code module can be implemented using a range of popular programming languages (such as C or C++), unlike other environments that limit language choice. Also, note that although the following description the system uses a specific processor architecture, the techniques described in the instant application are not limited to this architecture, and can be applied to a wide range of processor and/or hardware architectures.

Hence, the system can provide the following benefits:

Protection: Untrusted modules cannot have unwanted side effects on a host process or any other part of the system, including other untrusted modules. Furthermore, untrusted modules cannot communicate directly with the network. The system prevents untrusted modules from making unmediated system calls, thereby preventing such untrusted modules from using such system calls to exploit system vulnerabilities by directly creating or modifying files in the file system, starting processes, engaging in clandestine network communications, etc. The untrusted module relies entirely on the secure runtime environment for access to system services, with the secure runtime environment taking full responsibility for the safety of the services provided.

Privacy: The system ensures that untrusted modules cannot read or write data to which they have not been explicitly granted access.

Operating System Portability: The system allows untrusted modules to be executed on any operating system that supports the secure runtime environment.

Multi-threading: Untrusted modules may be multi-threaded.

System Implementation and Performance: The system is optimized to need only a small trusted code base, thereby facilitating portability, security audits, and validation. The system provides performance for compute-intensive modules that is comparable to unprotected native code performance while achieving a comparable level of safety to virtual machine and language-based approaches.

Ease of Module Implementation: External developers can easily write and debug modules to be executed in the system using familiar tools and programming techniques.

Note that the described system simultaneously addresses both performance and portability issues while eliminating security risks, thereby allowing developers to use portable, untrusted native-code modules in their applications without requiring application users to risk the security of their devices and/or data.

In some embodiments, the system includes: a modified compilation chain that includes a modified compiler, assembler, and linker that are used to generate safe, compliant executable program binaries; a loader/validator that loads the module into memory and confirms that the untrusted module is compliant with a set of code- and control-flow integrity requirements; and a runtime environment that provides data integrity and moderates both the module's ability to access resources and how the module accesses such resources. The compilation and validation processes ensure that unwanted side effects and communications are disabled for the untrusted module, while the secure runtime environment provides a moderated facility through which a limited set of desirable communications and resource accesses can safely occur. These components are described in more detail in the following sections.

3. Compiling and Validating Native Code Modules

In some embodiments, complementary compilation and validation processes ensure that only safe native code modules are created and loaded into the system. The compilation process involves using a compiler, an assembler, and a linker which work together to generate a system-compliant binary native code module. A validating mechanism (or validator) loads this native code module into memory, and confirms that the native code module is indeed system-compliant. Note that validating the compiled module at load time (as the last action prior to execution) allows the system to use (but not trust) the output of the compiler. Such validation can also detect any malicious actions that attempt to compromise the safety of the native code module between compilation and execution.

Note that the system can use a combination of compiler-based techniques and static binary analysis (e.g., analysis of assembly code during validation) to achieve safety with lower execution overhead than dynamically analyzing and rewriting executable code at runtime (as is commonly done in some virtual machine environments). Additionally, static binary analysis facilitates implementing the validator and runtime environment in a small trusted code base, thereby facilitating security verification for the code base and reducing the likelihood of bugs and/or vulnerabilities. In some embodiments, however, the system may also use dynamic analysis and code-rewriting techniques.

The following sub-sections describe techniques and mechanisms used by the compilation and validation processes to ensure that only safe native code modules are loaded and executed in the system.

3.1 Eliminating "Unsafe" Instructions

In some embodiments, creating a system-compliant native code module involves following a set of restrictions and/or policies that preserve the integrity and security of code, control flow, and data. Preserving code integrity involves ensuring that only "safe" instructions can be executed by the native code module, and that no unsafe instructions can be inserted at runtime via dynamic code generation or self-modifying code. Restricting the instruction set which is available to the native code module also can help to make decoding the native code module (during validation) more reliable. Preserving control flow integrity involves ensuring that control flow instructions in the native code module cannot violate security by calling instructions outside of the native code module. Preserving data integrity involves ensuring that a native code module cannot perform "wild reads" or "wild writes" (e.g., reads or writes outside of a specified data region associated with the native code module).

In some embodiments, the validator helps to achieve code, control-flow, and data integrity for a native code module in part by ensuring that a set of "unsafe" instructions from the ISA (instruction set architecture) are not included in a native code module. For instance, for the x86 ISA, the validator may disallow the use of the following instructions and/or features in a native code module:

the syscall (system call) and int (interrupt) instructions, which attempt to directly invoke the operating system;

all instructions that modify x86 segment state (including LDS, far calls, etc), because these instructions interfere with the memory segments that are used to enforce data integrity (see the segmented memory description below);

the rdtsc (read time stamp counter) and rdmsr (read from model specific register) instructions, as well as other hardware performance instructions and/or features which may be used by a native code module to mount side-channel attacks (e.g., by covertly leaking sensitive information);

various complex addressing modes that complicate the verification of control flow integrity;

the ret (return) instruction, which determines a return address from a stack location, and is replaced with a sequence of instructions that use a register-specified destination instead (and hence is not vulnerable to a race condition that allows the stack location to be used as a destination by a first thread to be overwritten maliciously (or erroneously) by a second thread just prior to the execution of the return instruction); and some aspects of exception and signal functionality—for instance, while the system may support C++ exceptions (as defined in the C++ language specification), the system may not support hardware exceptions (such as divide-by-zero or invalid memory reference exceptions) due to operating system limitations, and may terminate execution of an untrusted native code module when faced with such a hardware exception.

3.2 Ensuring Code Flow Integrity Using Pseudo Instructions

To provide effective code discovery (e.g., for the x86 architecture) and control integrity, the system may also need to restrict a set of control transfer instructions. Specifically, unmodified indirect control flow instructions that can transfer execution to arbitrary locations in memory need to be modified to guarantee that all indirect control flow targets are in memory regions that are valid for the native code module. Some embodiments limit indirect control flow instructions by: (1) not allowing return, far call, and far jump instructions, (2) ensuring that call and jump (jmp) instructions only use relative addressing and are encoded in a sequence of instructions such that the control flow remains within the native code module; (3) ensuring that register indirect call and jump instructions are encoded in a sequence of instructions such that the control flow remains within the native code module and targets valid instruction addresses within the module; and (4) not allowing other indirect calls and jumps.

Figures 2, 3A:
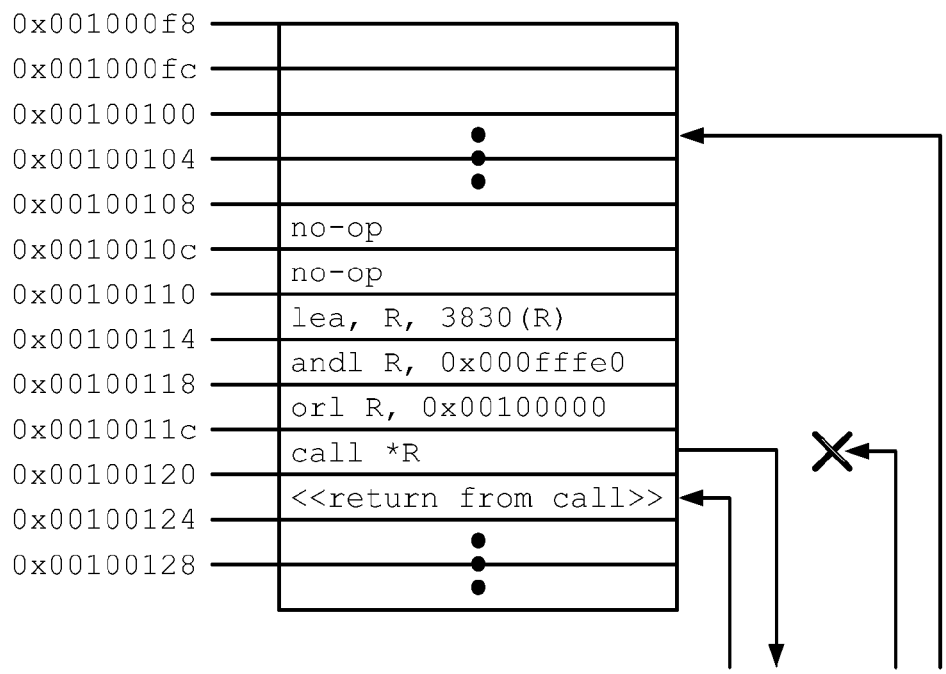
FIG. 2 illustrates several exemplary sequences of instructions that ensure that control flow remains within a given native code module.
FIG. 3A illustrates a memory region that is aligned to 32-byte boundaries and contains a pseudo instruction.

FIG. 2 illustrates several exemplary sequences of instructions that ensure that control flow remains within a given native code module. For instance, the compiler can use a pseudo call instruction 200 in native modules that performs a logical "and" (andl) and a logical "or" (orl) instruction upon the destination address (in register R) prior to the call to ensure that the destination address is masked to be within the bounds of a memory segment for the native module code. A substantially similar pseudo jump instruction 202 incorporates substantially similar logical masking operations.

Note that the actual immediate values in pseudo call instruction 200 and pseudo jump instruction 202 include two parameters (TSAFETY_MASK and TEXT_BASE) that need to be filled in. Also note that these parameters can only be filled with actual masking values at the time that the system knows the code text size and memory location. For instance, the immediate values used in pseudo instructions for a given native code module may be written by the linker at link time or by the validator during the validation process.

An exemplary pseudo call instruction with mask values 204 illustrates a set of values that limit the call target to a 32-byte aligned target (as specified by the 'e0' lower bits in the andl instruction) in a one megabyte code section (as specified by the 'fife' activated bits in the andl instruction), and then offsets the base address to a specific memory region (that begins at memory address '0x00100000', as specified in the on instruction) associated with the code for the native code module.

To ensure control flow integrity, some embodiments limit the set of instructions that can be control flow targets. For instance, for the above pseudo instructions, the system ensures that the logical instructions in the pseudo instruction are executed before the jump or call instruction. Without this guarantee, another set of instructions could set register R to a desired target address and then branch (or otherwise change the control flow) directly to the specified call or jump instruction, thereby bypassing the masking instructions (and potentially violating control flow integrity).

In some embodiments, the system ensures that indirect jumps and calls can only target a limited set of addresses. For example, the system may only allow 32-byte boundaries to serve as control flow targets, and then ensures that the instructions in the native code module are aligned such that all control flow targets are aligned along 32-byte boundaries to conform to this requirement. For instance, the system can achieve the desired alignment during the compilation process (e.g., by inserting no-op instructions where needed), when the set of control flow targets is typically known (e.g., such targets often include functions, labels, returns from functions, and other known targets), and then re-confirm that the native code module is properly aligned in the validator.

Note that the granularity of target alignment in the system may be adjusted based on a number of factors, such as the maximum instruction size for a given architecture and the largest set of consecutive, un-targetable instructions needed. For instance, for an exemplary architecture, the system might align targets along 16-byte, 32-byte, 64-byte, or other power-of-2 boundaries to simplify masking. Alignment granularity may also be determined based on estimates of associated overheads. Note that a larger alignment granularity may lead to undesirable increases in code size due to increased no-op padding.

FIG. 3A illustrates a memory region that is aligned to 32-byte boundaries and contains a pseudo instruction. In this example, because indirect jumps and calls can transfer to any aligned 32-byte address, no instruction (including the sub-instructions of the pseudo instructions) is allowed to overlap a 0 mod 32 boundary (e.g., memory addresses 0x00100120 or 0x00100100, both of which can serve as branch targets, unlike the call instruction at memory address 0x0010011c). Note also that the call instruction (at memory address 0x0010011c) needs to be aligned such that the following address is a valid target, so that the jump instruction that returns from the function called can return to the calling point.

3.3 Using Hardware Support for Memory Segments

In some embodiments, the system uses hardware-based segmented memory protection to facilitate data and control flow integrity. Memory segments can be manipulated using a set of instructions and registers that establish a base address and bounds for a given memory segment, with the hardware ensuring that memory accesses during segmented operation are limited to addresses between the base address and the bounds of the memory segment. For instance, for the x86 architecture, the system can set values in the segment registers to control the range of data accesses as well as how the instruction pointer is interpreted for the code segment (e.g., using the code segment (CS) register) to ensure that: (1) data accesses are limited to a specific data segment for the native code module, thereby ensuring data integrity; and (2) the code text region for each native code module starts at an address of zero.

After setting up segment state (e.g., setting up a set of segment control registers appropriately), and ensuring that untrusted code cannot change this segment state, native code modules can be allowed to use the same data reference instructions used by any other programs, but with the hardware actively ensuring that code instructions and data references are sandboxed. Hence, the system can use hardware-supported segmented memory to provide "hardware fault isolation." Such hardware fault isolation eliminates the need to use special sandboxing sequences for data references, thereby helping improve performance and making it easier to adapt compilers to generate native code modules. Note, however, that in some embodiments where hardware support for memory segments may not be available or accessible the system may need to fall back to data reference sandboxing techniques that instead ensure data integrity via software fault isolation (with, most likely, an additional performance overhead).

In some embodiments, the use of hardware to provide segmented memory support for native code modules simplifies the masking operations needed for the above-described pseudo instructions. Because the system can use hardware-based segmented memory support to base the code text of the native code module at address zero (0x00000000), no base memory offset is needed, and the system can eliminate the orl instruction from the pseudo instructions. Furthermore, because the execution of out-of-bounds instructions is now prevented by the segmented memory support, the system no longer needs to mask the higher-order bits of the andl instruction. For instruction sets with variable-size instructions (such as the x86 architecture), this may allow the pseudo instructions to use a simpler (and smaller) and instruction.

Figure 3B:
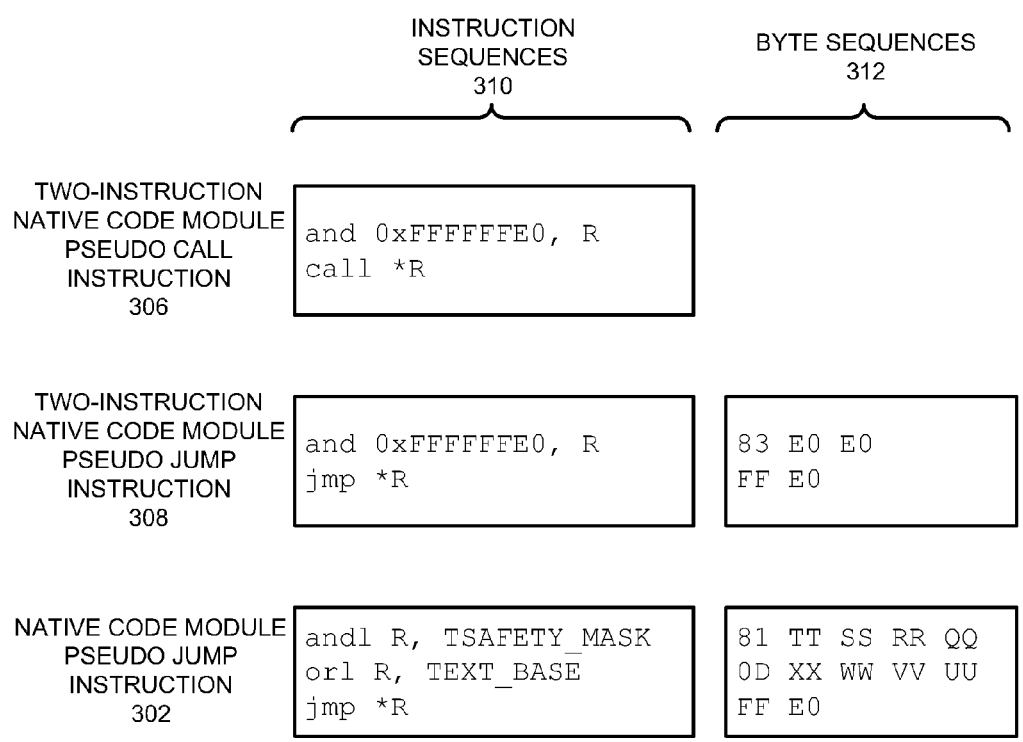
FIG. 3B illustrates reduced-size pseudo instructions that can be used in conjunction with hardware segmented memory support.

FIG. 3B illustrates reduced-size pseudo instructions that can be used in conjunction with hardware segmented memory support. The two-instruction pseudo call 306 and jump 308 instructions that can be used in native code modules now only need an additional and instruction that ensures that the control flow target is aligned (e.g., in this case to 32-byte boundaries, as specified by the 0xE0 value, which is logically expanded to 0xFFFFFFE0 by the hardware during execution of the logical "and" instruction). FIG. 3B displays both exemplary instruction sequences 310 for the two-instruction pseudo instructions as well as exemplary x86 byte sequences 312 (including x86 instruction opcodes and immediate values) for the two versions of pseudo jump instructions (308 and 202). The two-instruction pseudo jump instruction 308 uses only five bytes (note that the processor sign-extends the value 0xE0 to 0xFFFFFFE0, thereby allowing the use of a two-byte and instruction), while the byte sequence 312 for the previous pseudo jump instruction 202 displayed in FIG. 2 may use 12-14 bytes (depending on the specific instruction and registers used), where 0xqqrrsstt is a four-byte constant representing the next power of two larger than the text segment size minus the alignment, and 0xuuvvwwxx is the text segment's load address. Note that reducing the byte size of the pseudo instruction sequences can reduce code size increases associated with the above-described techniques.

3.4 Loading Native Code Modules into Memory

In some embodiments, the system invokes a loader (which can be incorporated into the validator, or exist as a separate component) upon receiving an untrusted native code module. The loader reads the executable content and supporting data for the module and loads the module into memory, minding factors such as alignment restrictions and relative position. (Note that if hardware-supported memory segments are not supported, or shared libraries are used, the loader at this point may need to traverse relocation records associated with the module to update addresses based on the actual load address for the various segments of the module). The loader may also edit some of the code sequences in the native code module to enable runtime enforcement of control-flow integrity. After the module has been loaded and relocations have been applied, the system can validate the executable content.

Figure 4:
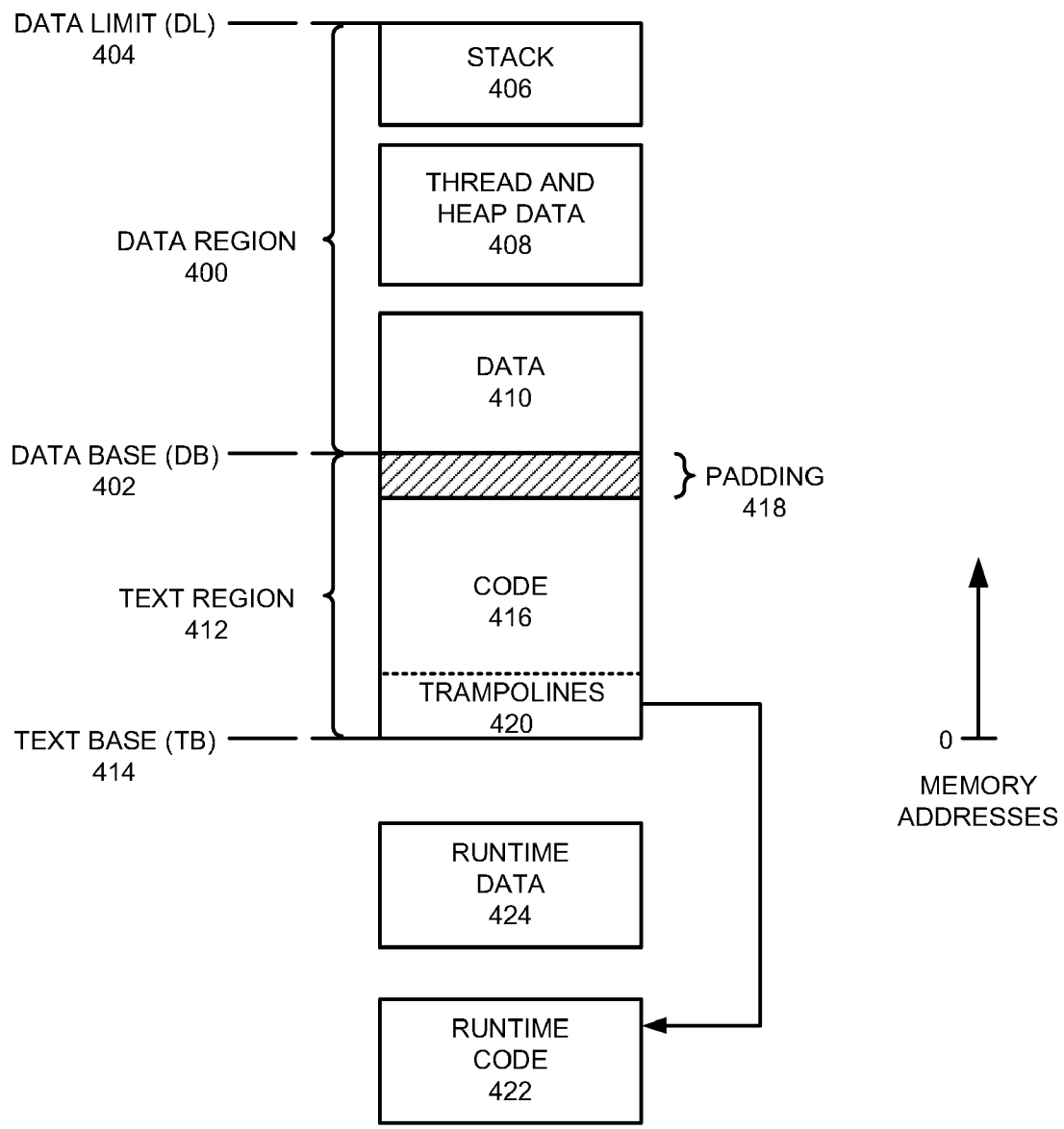
FIG. 4 illustrates the layout of a native code module that has been loaded into a memory segment.

FIG. 4 illustrates the layout of a native code module that has been loaded into a memory segment. As described above, the system can guarantee data integrity by setting up segment state such that the untrusted native code module is only allowed to perform data access on a data region 400 (e.g., using x86 segment registers). The native code module's data region 400 stretches from data base address (DB) 402 to data limit address (DL) 404, and allocates space for the stacks 406 of each thread (in the native code module), data for threads and an application-managed heap 408, and data space 410 for global variables. A read-only code text region 412 for the native code module stretches from text base (TB) address 414 to the text limit address (TL), which is equal to DB 402. Also note that code text region 412 may be padded 418 beyond the actual size of code 416 (e.g., using one-byte no-op (nop) and/or one-byte halt (hlt) instructions) so that the size of text region 412 is an even power of two (e.g., to simplify the masking of control flow operations).

To facilitate implementation, the code text region 412 may also be statically linked at a start address of zero (e.g., providing a zero-based address range for the native code module). The validator checks that instructions in code 416 can only refer to data in data region 400. Note, however, that code instructions can arbitrarily read or write any location within the data region, and the validator and runtime environment may not enforce type-safety or more fine-grained bounds restrictions. Note also that while the runtime system may read the native code module's data, it needs to be very careful not to trust this data in any way that can affect system security. In particular, the validator and runtime environment guarantee that the native code module will be safe, but do not guarantee that any operations performed or values generated by the native code module are "correct" (e.g., correctly perform the actions or generate the values intended by the programmer and/or desired by the user).

To ensure control integrity and data integrity, the system only allows instructions in the code 416 to transfer control to valid instructions in the text region 412. As mentioned previously, the system prevents jumps into the middle of an instruction or the middle of a critical instruction sequence by statically checking direct control flow transfers and ensuring that indirect control transfers can only transfer control to aligned targets (via no-op padding).

However, the native code module needs to have some way to communicate results to external clients and, as allowed, make requests to the runtime system. In some embodiments, the system provides a constrained system call interface that can only be accessed via a set of "trampoline instructions" (or "trampolines") 420 found in text region 412. These trampoline instructions 420 include a limited set of safe (and aligned) entry points into the runtime system that are initialized by the loader/validator with trusted code that can transfer control to trusted runtime code and/or services 422. These trampoline instructions 420 are the only mechanism that can be used to transfer control flow in and out of the untrusted native code module. Because these trampoline instructions 420 are trusted instructions that are generated by the secure runtime environment, they can include instructions that would otherwise be illegal in an untrusted native code module.

For instance, a set of trampoline instructions generated and inserted into the lowest portion of text region 412 may be used to transfer control to other trusted routines in the secure runtime environment, or send or receive messages to the client runtime or other services. Note that when the system uses hardware-supported memory segments, trampoline instructions 420 can be used to disable segmenting and return the system to (trusted) flat addressing for the execution of trusted code. Similarly, when the trusted code returns control to the native code module, the secure runtime environment can transfer control flow to a set of trampoline instructions 420 that re-establish the segmented memory support (and thereby re-enable data, code, and control flow integrity).

A set of trampoline instructions may be customized in a granular manner for specific native code modules, with the secure runtime environment only generating trampoline instructions for the set of accesses allowed for the given native code module. Note that the trampoline instructions are not constrained to the lowest portion (e.g., lowest 8 Kbytes) of text region 412, and can be located anywhere in text region 412. Note also that the system may maintain a separate, secure data region 424 that stores data related to the runtime and/or other services (e.g., to store browser internal state, file buffers, etc.).

In some embodiments, the validator performs a binary static analysis that confirms that an untrusted native code module conforms to the set of security constraints described above. The validator scans through the code section of each native code module that is loaded, decoding all executable instructions using a sequential traversal of the instruction stream that starts at the load (base) address. As described above, the validator rejects a native code module if it finds any defects, such as: illegal/disallowed instructions; alignment defects; direct branches with an invalid branch target; and/or unsafe indirect calls or jumps (that do not follow the target range and alignment restrictions described above). Also note that the validator does not need to fully disassemble the code (e.g., fully resolve the operands of instructions or reduce the set of instructions to a human-readable form), but instead can decode the opcodes and lengths of the instructions in the instruction stream.

During the decoding traversal, the validator builds and maintains two tables: a table of valid control-flow targets (VTT); and a table of known control-flow targets (KTT). Each valid (aligned) instruction that is encountered in the read-only code segment during the traversal is marked as valid in the VTT, and all unmarked instructions are considered invalid (for alignment purposes). During traversal the validator also recognizes all control-flow instructions, and notes the destination address of static targets in the KTT. For instructions with a target computed at run-time, the validator confirms that the instruction is part of a multi-instruction sequence with the appropriate mask values set by the loader, and marks intermediate instructions in the multi-instruction sequence as invalid in the VTT.

After decoding the code text segment (which may include multiple sections), the validator traverses the KTT to confirm that each target is marked as valid in the VTT. At this point, the validator detects unsafe situations caused by masking instructions (from a pseudo instruction) that overlap an aligned byte boundary (and were marked as invalid in the VTT during the traversal). The validator also performs an additional check that all indirectly-targetable instructions (e.g., all instructions on the aligned byte boundaries) are included in the VTT (e.g., to ensure that all indirect branch targets are valid). Note that the described static decoding process can be implemented using a relatively small amount of code, which facilitates verification of the security and correctness of the validator. Note also that the code text segment needs to be limited to "pure text," and not include a small set of problematic features and/or structures (such as static data or switch tables) that may be interpreted as bad instructions by the described decoding process. While interlacing read-only data in the instruction stream can provide performance benefits, such data in the code text segment could also add unwanted complexity to the logic that detects byte sequences of unsafe instructions.

Figure 5:
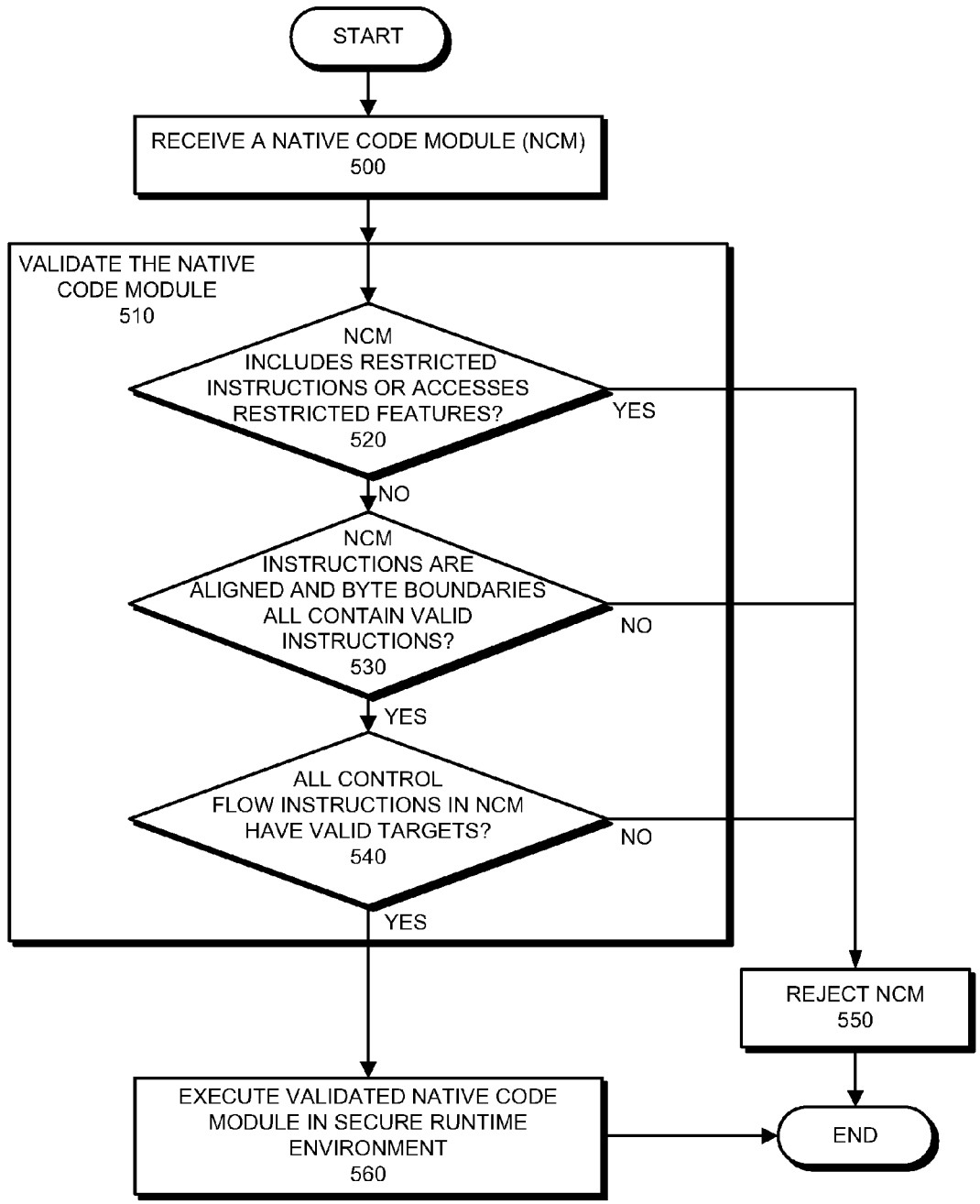
FIG. 5 presents a flow chart illustrating the process of validating an untrusted native code module to be executed on a computing device.

FIG. 5 presents a flow chart illustrating the process of validating an untrusted native code module to be executed on a computing device. During operation, the system receives an untrusted native code module to be executed on a computing device (operation 500). This native code module is comprised of untrusted native program code expressed in the instruction set architecture associated with the computing device.

Next, the system validates the native code module to confirm that the module will execute safely (operation 510). In doing so, the system first determines whether the set of instructions in the native code module includes any restricted instructions and/or accesses restricted features of the computing device (operation 520). If so, the system rejects the native code module (operation 550), and the process completes. If not, the system determines whether the set of instructions in the native code module are aligned along byte boundaries such that a specified set of byte boundaries always contain a valid instruction (operation 530). If so, and if all of the control flow instructions in the native code module have valid targets (operation 540), the system proceeds to execute the successfully-validated native code module in a secure runtime environment (operation 560).

Otherwise, the system rejects the native code module (operation 550). By validating the native code module, the system facilitates safely executing the native code module in the secure runtime environment on the computing device, thereby achieving performance substantially similar to trusted native code for untrusted program binaries without significant risk of unwanted side effects.

3.5 Compiling Compliant Native Code Modules

A system-compliant set of compilation tools can assist the validator by generating properly-aligned native code modules that correctly use the indirect call/jump pseudo instructions, do not include any disallowed instructions, features, and/or instruction sequences, and can be reliably decoded by the validator. Note that the generation of safe executables typically involves making only a small number of relatively local changes to existing compilation tool chains, thereby simplifying the set of modifications needed for vendors seeking to generate executable files that are compatible with and can execute safely in the described system.

Specific changes may include: modifying an assembler to add the above-described pseudo-instruction sequences and enforce the alignment of instructions; and modifying a compiler to change generated code sequences to reflect the above-described indirect control flow and perform function- and label-alignment. The requirements checked by the validator do not need to be kept secret, and can be openly published (without compromising security) to enable any party to create a set of compilation tools for the system and/or easily modify existing compilation tools to be able to generate compliant native code modules.

Because the system only trusts the validator, and not the compiler, the validator will always confirm that a given compiler's output meets the standards of safe execution and reject any native code modules that are non-compliant and fail the static binary analysis. The outputs of the compilation process can use standard binary formats that can be debugged using conventional debugging tools. Hence, programmers who prefer languages such as C and C++ can continue using languages and compilation tool chains that are substantially similar to what they have been using. Note that highly-tuned, hand-coded assembly sequences and/or compiler intrinsics (e.g., manual micro-architecture optimizations) can also be used for native code modules, as long as they follow the above requirements (e.g., the specified alignment requirements and instruction restrictions).

Note that the described system may not execute pre-existing non-compliant binaries, and may instead require an application to be rebuilt as a compliant native code module using a compliant compilation process. However, in some embodiments the system may support non-compliant binaries using binary translation techniques that achieve the level of security guarantees needed to be approved by the validator. Such binary translation techniques can be used in scenarios where it is desirable to incorporate code from sources that cannot or will not modify their compilation tool chains to support compliant native code modules. Typically, using a compliant compilation tool chain involves less overhead in the software development process for native code modules, because a binary translator may not be perfectly reliable, and may involve some trial and error on the part of developers before generating a module that validates successfully.

Because untrusted native code modules execute natively on the hardware of computing devices, the above-described techniques enable the system to safely achieve performance substantially similar to the performance of trusted native-code execution without sacrificing security. Note that the code size of native code modules may increase due to additional instructions in pseudo-instruction sequences and alignment-related padding. However, because instruction caches have become very large and often work more efficiently when indirect branch targets are aligned, and the number of indirect control flow instructions is typically not large, the effect on performance is also typically limited. Hence, the system provides execution performance which is substantially similar to the performance of unprotected native code, and outperforms other existing approaches (such as interpreted languages and virtual execution environments).

In summary, the compilation process creates a system-compliant native code module that can be validated to confirm that the executable content in the native code module conforms to a set of desired security requirements. Moreover, the described techniques used by the modified compilation tool chain, loader, and validator allow untrusted native code modules that can be executed safely in a secure runtime environment with native-code performance. The secure runtime environment, which provides execution monitoring for the untrusted native code module by moderating interactions between the module and other software or hardware entities, is described in more detail in the following section.

4. A Secure Runtime Environment for Executing Native Code Modules

As described above, the compilation and validation processes ensure that native code modules are compliant with system requirements, and hence do not have any unwanted side effects that affect system security. However, while isolating native code modules from all other software and hardware components preserves security, software modules typically do not execute in isolation, and need to communicate results to a client application and/or access system resources. Some embodiments of the system enable limited communication between the native code module and other system components using a mechanism that provides a secure runtime environment.

In some embodiments, the secure runtime environment:
provides the ability to load and launch native code modules;
provides an execution environment for native client modules that includes communications, threads, memory management, and debugging support;
moderates access to system resources using a simple access policy that ensures that native code modules do not violate system protection and privacy constraints;
supports multiple native code modules isolated from each other; and
can be implemented in a small amount of code that can be both easily audited as well as ported to multiple operating systems that run on the same hardware architecture.

The secure runtime environment moderates both which resources can be accessed (and communicated with) by the native code module, as well as how such resources are accessed, thereby ensuring that the native code module relies entirely on the secure runtime environment to access system services and cannot perform sensitive operations without explicit mediation. For instance, a native code module cannot read or change file system state, initiate network (or inter-module and/or inter-process) communications, or launch computations outside of an isolated "sandbox," and instead must rely on the secure runtime environment to perform such interactions (if allowed) on its behalf.

In some embodiments, the secure runtime environment includes multiple aspects of runtime functionality. For instance, the secure runtime environment may include:
1. Client runtime functionality that provides an interface that allows client applications to create services based on untrusted native code modules and communicate with such services;
2. Service runtime functionality that serves as an application execution environment that loads and launches native code modules on behalf of clients and provides access to a set of basic system services while ensuring the isolation of intended security domains;
3. IMC (inter-module communication) runtime functionality that provides mechanisms for communications between trusted modules and the service runtime; and
4. Developer runtime functionality that is linked into the untrusted native code modules during development to facilitate communication with other aspects of the secure runtime environment.

The following subsections describe the above-mentioned aspects of the secure runtime environment and the process of executing code in the secure runtime environment in more detail.

4.1 Client Runtime

Because a wide range of application types may seek to access the native code performance of native code modules, the client runtime provides a general external interface for interacting with such modules. For instance, the client runtime can: provide facilities for loading and unloading native code modules; present the set of functions supported by a native code module to clients (e.g., exposing a list of external procedure calls available for the native code module); and provide hooks that the client environment can use to call such functions. If the native code module executes in a separate process and/or address space from a client application, the client runtime may also be responsible for marshaling data between the two entities.

In some embodiments, the system may involve multiple client runtimes that support different types of clients. For instance, in a browser environment, client runtime functionality to support JavaScript may be included in a browser plug-in that allows JavaScript applications to load, unload, and invoke functions in native code modules. For example, the plug-in may provide a loadURL function that enables a JavaScript application to specify the URL (uniform resource locator) for a desired native client module and receive callback notification that indicates whether or not the load succeeded.

Upon a successful load, the client runtime can export a list of invokable functions associated with the module to the JavaScript application, along with information about the parameters available for each function. In some embodiments, the client runtime (and native code modules) may support a type descriptor convention that allows parameters and return information to be marshaled between a client application and a native code module in the form of an array of read-only values. (Note that due to security issues, pointers cannot be used to pass parameters and return information between client applications and native code modules).

Note that the functionality provided by the native code module may be used and/or accessed differently, on a per-client-application basis. For instance, functions exported by the native code module may be either blocking or non-blocking, and the entry points into a native code module used by different client applications may vary. For instance, a native code module might only perform computations in response to individual functions called by a client application, or may instead continuously monitor a message dispatch loop that receives input from a shared memory buffer (see below) or some other event management queue.

4.2 Service Runtime

In some embodiments, the service runtime provides functionality similar to that of an operating system, e.g., loading and launching modules on behalf of the host computation, providing access to a set of basic system services, and ensuring isolation between the separate security domains of client applications and untrusted native code modules.

Because native code modules are restricted from directly accessing the native operating system kernel, all communications and system service requests made by native code modules are submitted to the service runtime. This intermediary role enables the service runtime to mediate all communication and access to system resources and enforce an access control policy that is stricter than that of the underlying native operating system.

In some embodiments, upon receiving a request from the client runtime to load a native code module, the service runtime:

1. Allocates memory to hold the native code module;
2. Downloads (or loads) the native code module and loads the native code module's text and data into memory;
3. Initializes any needed statically-initialized data and, if needed, updates the constant fields in any masking instructions (as described above for pseudo-instructions);
4. Adds runtime information for the native code module (such as the above-described trampoline instructions, along with correct jump addresses);
5. Runs the validator on the native code module (as described above), (optionally) disabling any invalid instructions detected by the validator;
6. Ensures that the memory pages for the executable code of the native code module are protected and that data integrity mechanisms are active for the data segment of the native code module;
7. Sets up the heap for the native code module; and
8. If specified by the calling client, sets up initial arguments and jumps to an entry point for the native code module.

Note that loading the native code module may also involve performing a set of relocations for the native code module (e.g., as specified in a relocation table for the native code module) if shared libraries or non-zero-based segments are used. Alternatively, if the native code module is compiled to include fixed zero-based addresses, no relocation is needed.

The service runtime is responsible for providing essential system services to native client modules, including memory allocation, thread creation, and communications. The service runtime also provides a system call interface to loaded native code modules, and performs the system calls allowed for each given module on its behalf. As the intermediary, the service runtime is responsible for providing these services while insuring that a malicious native code module cannot cause security problems (e.g., trigger disallowed system calls) or use resources inappropriately.

For example, the service runtime ensures that a multi-threaded native code module cannot potentially exploit vulnerabilities due to race conditions in the system call interface. Note that because the service runtime loads untrusted native code modules into memory, and interacts directly with such modules as they execute, bugs in the service runtime can jeopardize the security properties of the entire system. Hence, ensuring the correctness and security of the system runtime, and every interface supported by the system runtime, is a high priority.

In some embodiments, the system provides debugging support for native code modules. For instance, the compilation process may provide mechanisms for building and linking a native code module to a different runtime implementation that includes the same interfaces as the secure runtime environment but where the different implementation of the service runtime provides additional debugging support and/or output. Alternatively, the service runtime and/or the developer runtime may include additional functions and/or capabilities that facilitate debugging native code modules.

To ensure the integrity of the execution of the service runtime code, a service request made through the trampoline code of a native code module triggers a stack switch. This stack switch ensures that the stack memory used to execute the service runtime code is not subject to modification by other threads within the native code module.

In some embodiments, the service runtime monitors an executing native code module to ensure that the module is not deliberating wasting resources, attempting to distribute system information using covert channels, or performing other mischief. Note that while validating and ensuring the code, control flow, and data integrity of a native code module provides security and thereby eliminates a primary set of threats, a misbehaving native code module can still (either maliciously, or also erroneously) operate inappropriately and waste system resources. For instance, a native code module may include infinite loops or memory leaks, attempt to corrupt client applications using corrupt output, or attempt to convey system state information to external parties using covert channels.

To mitigate such issues, the service runtime may incorporate one or more of the following: a loop timer that can stop the execution of a native code module if an infinite loop is detected and/or suspected; a memory limit and tracking system that ensures that the native code module does not attempt to allocate excessive amounts of memory; data integrity checkers that ensure that data output by the native code module follows a valid format (which may involve ensuring that the data output by the native code module is in a format that can feasibly be checked); and techniques that attempt to eliminate or restrict the bandwidth of covert channels, for instance by allowing native client modules to only access a low-precision hardware timer (and thereby preventing the native code module from finely synchronizing a set of covert actions intended to convey information to external parties). Note that while complete elimination of covert channels may be impossible, reducing the bandwidth of such channels can render them harmless.

4.3 IMC Runtime

In some embodiments, the system allows native code modules to communicate amongst themselves and with external applications. For instance, the IMC runtime can facilitate data-intensive collaboration between a native code module and an external application using shared memory buffers managed by the service runtime. Note that, depending on whether the service runtime is in the same process as the external application, sharing memory buffers may involve translating addresses between processes and managing memory map data.

Also, note that because some external applications may be untrusted (e.g., a JavaScript application that interacts with a native code module), the system may provide an abstraction for "memory handles" that can be used to access such shared memory buffers (instead of pointers), where the IMC runtime provides mechanisms for translating such handles to addresses.

Because both client applications and native code modules may be multi-threaded, some embodiments may involve using mutexes to ensure safe concurrent access to shared memory buffers and prevent data races. Safe concurrent access to shared memory can enable close interaction between a client application and a native code module, and reduce the number of times data needs to be copied for a request.

For instance, the native code module can implement a message loop that receives messages and/or requests from client applications and/or the service runtime using such shared memory buffers. Alternatively, the native code module may receive messages from client applications (via the service runtime) that include handles referring to shared memory buffers.

Note also that both sides of the communication may need to perform error checking to ensure the validity of shared data. For instance, the client application may need to thoroughly check data shared with or received from an untrusted native code module to avoid problems caused by buggy or malicious modules. Moreover, client applications should be discouraged from putting data structures that include client-application-sensitive data, such as function pointers and pointers valid only in the parent (client application) address space, into shared memory buffers, because a native code module could potentially modify such data and thereby exploit or negatively affect the client application.

In some embodiments, native code modules may run as threads in the address space of a host process. In these embodiments, system-provided data integrity mechanisms create a privacy sub-domain within the address space of the host process that prevents the thread for the native code module from seeing process memory outside of its sandbox. Moreover, a shared memory segment facilitates information exchange between client applications in the host process and the native code module.

Note that the IMC runtime has direct access to sensitive structures within the service runtime, and potentially also within client applications. Hence, as with the service runtime, ensuring the correctness and security of the IMC runtime is a high priority.

4.4 Developer Runtime

Some embodiments provide additional support needed to access aspects of the service runtime from user-developed code in a native code module. As described previously, native code modules interact with the service runtime by making calls from trampolines in the native code module, and the service runtime mediates calls into the native code module by client applications. The developer runtime may include a set of "jacket" routines that prepare any parameters that need to be provided prior to invoking the trampolines. The developer runtime can also provide a main message processing loop and the data structures that are needed to describe the functions and/or functionality available in the native code module to client applications (via the client runtime).

The developer runtime may also include library code that is released as part of a software developer kit and provides developer-transparent support for a set of common functionality. For instance, the developer runtime may include support for functions such as malloc, free, and printf in the context of the secure runtime environment by supplying versions of such functions that correctly route to the service runtime (via trampolines), as opposed to using direct system calls as in existing systems. The library code may also provide support for a full complement of synchronization primitives and atomic operations (e.g., to support shared memory access as described above for the IMC runtime) or enable developers to write to stdout for debugging (e.g., by supporting a modified printf function in the library). Note that some traditionally "standard" system functions, such as fopen, may not apply in the secure runtime environment, and hence may not be supported.

Note that while the developer runtime is considered part of the runtime system that facilitates the native code module accessing the service runtime, the program code relating to the developer runtime is compiled into the native code module itself, and is therefore untrusted. As a result, such program code may not need to be audited to the same level as code in the service and IMC runtimes. Functionality pushed into the developer runtime can automatically benefit from the security assurances provided by the validator and the rest of the secure runtime environment. Note that code from the developer runtime may be statically linked into the native code module.

4.5 Executing Native Code Modules in the Secure Runtime Environment

Figure 6:
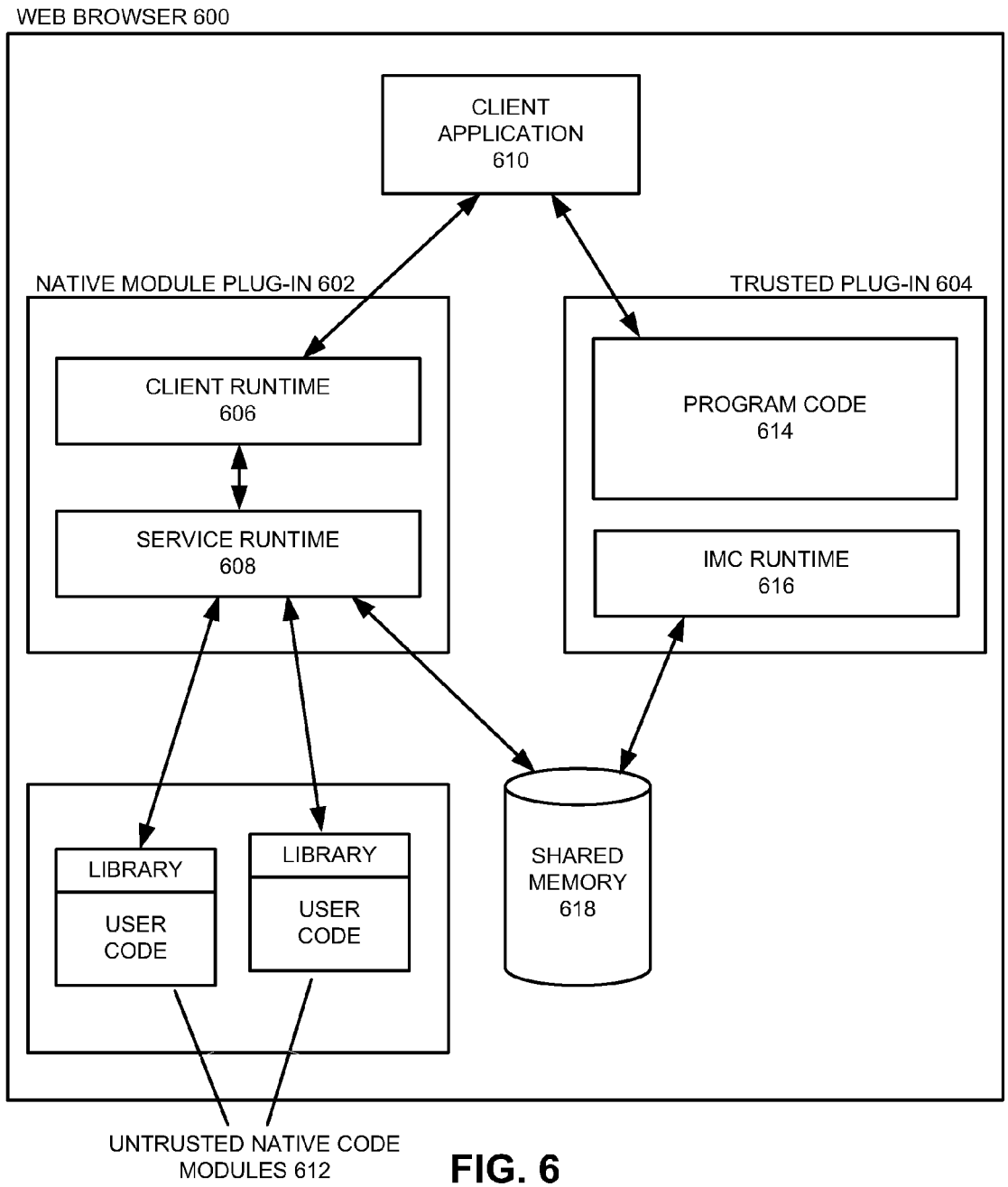
FIG. 6 illustrates untrusted native code modules executing in a secure runtime environment in a web browser.

FIG. 6 illustrates untrusted native code modules executing in an exemplary secure runtime environment in a web browser. In this embodiment, web browser 600 includes a trusted native module plug-in 602 and a second trusted plug-in 604. Native module plug-in 602 includes client runtime 606 and service runtime 608. Note that while client runtime 606 and service runtime 608 are illustrated as independent entities collocated in native module plug-in 602, they may be implemented in a wide range of configurations (e.g., integrated into a single module, or as completely separate applications). During operation, a client application 610 (e.g., a JavaScript application) in web browser 600 sends a request to client runtime 606 to download several native code modules.

Client runtime 606 forwards this request to service runtime 608, which downloads and loads the untrusted native code modules 612 into memory.

After successfully validating, ensuring the integrity of, and setting up structures for untrusted native code modules 612, service runtime 608 notifies client runtime 606 that untrusted native code modules 612 have been loaded, and client runtime 606 in turn informs client application 610 that untrusted native code modules 612 are available. Client application 610 can then query client runtime 606 for the list of calls available for untrusted native code modules 612, and request that such calls be invoked (via client runtime 606 and service runtime 608).

Program code 614 in trusted plug-in 604 may also seek to invoke functionality available in untrusted native code modules 612, prompting the creation of a shared memory segment in shared memory 618 that allows communication between trusted plug-in 604 and untrusted native code modules 612 (via IMC runtime 616 and service runtime 608).

Note that in FIG. 6, only native module plug-in 602 and trusted plug-in 604 are trusted, and that the downloaded client application 610 and untrusted native code modules 612 are untrusted. Note also that while the developer runtime is not explicitly illustrated, it is reflected in the library code and user code of the untrusted native code modules 612. Finally, note that untrusted native code modules 612 cannot interact with each other directly, but can only interact by permission of and via service runtime 608.

Figure 7:
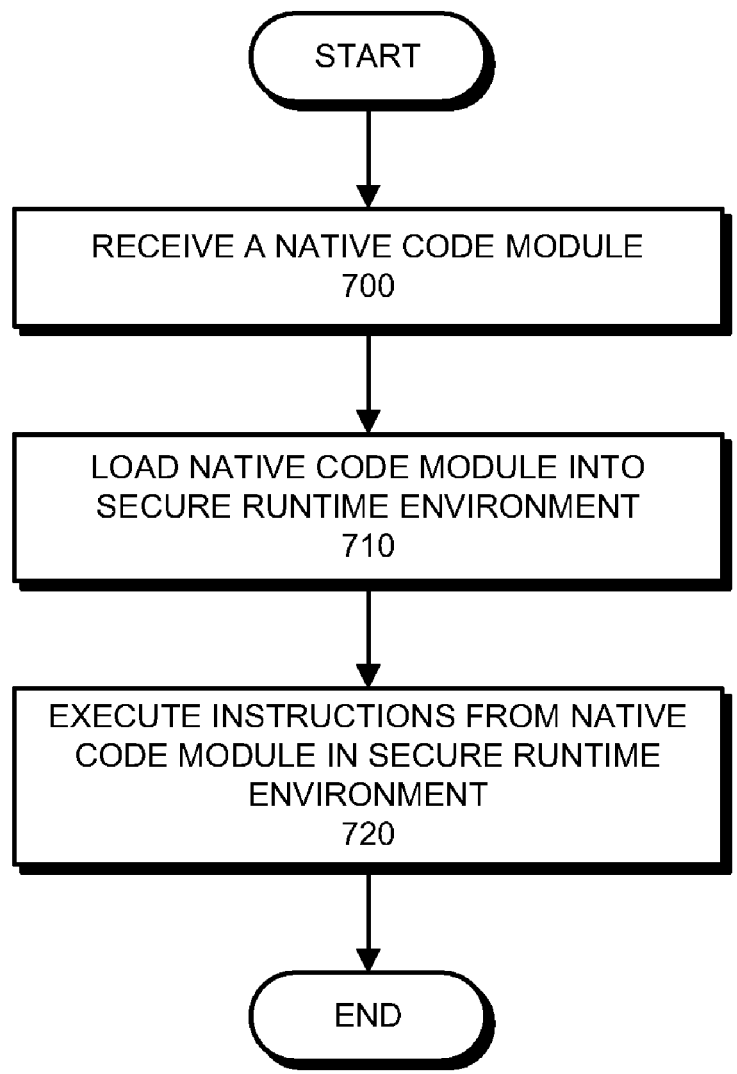
FIG. 7 presents a flow chart illustrating the process of safely executing a native code module on a computing device.

FIG. 7 presents a flow chart illustrating the process of safely executing a native code module on a computing device. During operation, the system receives an untrusted native code module to be executed on a computing device (operation 700). This native code module is comprised of untrusted native program code expressed in the instruction set architecture associated with the computing device. The system loads the native code module into a secure runtime environment that enforces code integrity, control flow integrity, and data integrity for the native code module (operation 710).

Then, the system proceeds to execute instructions from the native code module in the secure runtime environment (operation 720). During execution, the secure runtime environment moderates which resources can be accessed by the native code module as well as how these resources are accessed. Executing the native code module in the secure runtime environment facilitates achieving native code performance for untrusted program code without significant risk of unwanted side effects.

Figure 8:
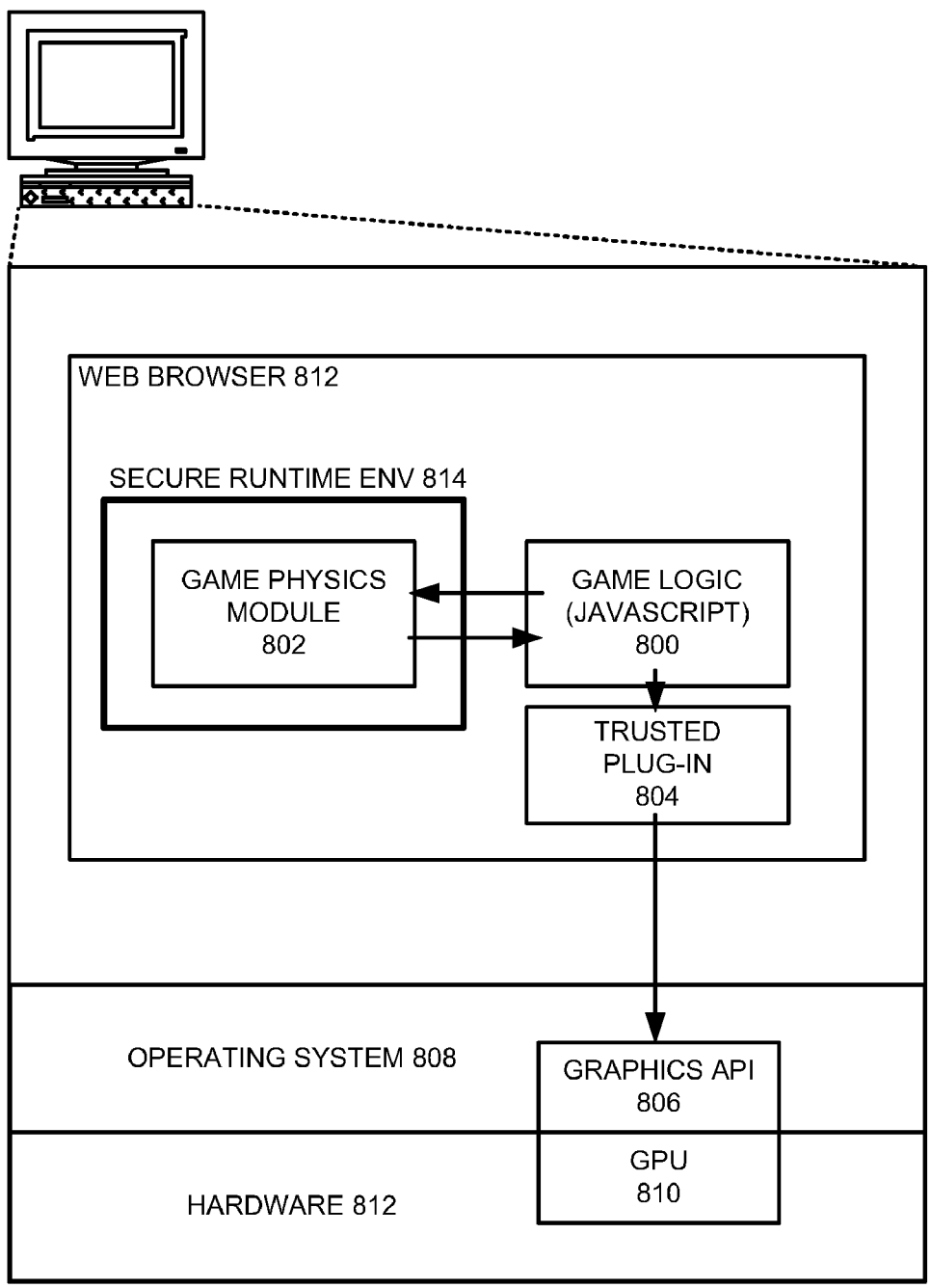
FIG. 8 illustrates an exemplary application that interacts with an executing native code module.

FIG. 8 illustrates a gaming application in web browser 812 that interacts with an executing native code module that comprises both game logic 800 (implemented in JavaScript) as well as a game physics module 802 that is implemented as an untrusted native code module that executes in secure runtime environment 814. Some aspects of the game may not need native code performance. For instance, game logic 800 may not need native code performance to determine and track mouse motion or keyboard input.

However, generating high-resolution graphics at high frame rates may be beyond the performance and language capabilities of JavaScript. As a result the application may be organized such that game logic 800 sends relevant positioning info (related to mouse actions) to game physics module 802, which generates a set of graphics and/or sound information using secure native code performance. Game logic 800 may include knowledge of how to forward the output of game physics module 802 through another layer (e.g., trusted browser plug-in 804, which provides a browser graphics subsystem) directly to a graphics API (application programmer interface) 806 in operating system 808 and a graphics processing unit 810 in the hardware 812 of computing device 200. Alternatively, game physics module 802 may also be allowed to send graphics data directly to the trusted plug-in (thereby bypassing the JavaScript game logic 800 completely) using the above-described communication methods (such as a shared memory buffer).

Note that the split of functionality across client applications and native code modules may vary on a per-application basis. For instance, some applications may minimize the amount of functionality implemented in JavaScript, and push as much functionality as possible to native code modules to optimize performance. Note that native code modules can allow legacy code to be leveraged in client applications without requiring such code to be rewritten in a new language (such as JavaScript). Re-compiling such legacy code to create a compliant native code module may involve substantially less effort than a complete re-write.

In some embodiments, the plug-in that supports the native code module is embedded in the code for a web page in a manner that allows client applications to discover and communicate with the native code modules available in the system. For instance, the plug-in and/or native code modules can be loaded in web documents such that connections for the interfaces of native code modules are exported to the plug-in. A client application can then connect to the plug-in via the document object model to determine connection information for the available native code modules.

Note that in some embodiments, the described system is operating-system neutral, thereby facilitating operating system portability. Compiler adjustments (and the subsequent verification by the validator) relate to sets of disallowed instructions (e.g., by instruction opcode) and control flow, which are operating-system independent. Similarly, other system actions can also be implemented to avoid operating-system-specific operations (e.g., because hardware exceptions are often handled in an operating-specific manner, the system may choose to handle hardware exceptions in a uniform, operating-system-neutral way by terminating native code modules that generate hardware exceptions).

Note that there is no need to perform virtual instructions/operating or instruction translations for a virtual machine in the operating system, because the instructions in the native code module are in native assembly code already and hence can execute directly on the hardware of the given computing device. An operating-system-neutral approach that is easily portable across different operating systems that run on a common hardware architecture can provide a beneficial intermediate alternative beyond virtual machine environments and interpreted languages, which can provide operating-system and/or instruction-set-architecture neutrality but are slower than native code.

In summary, some embodiments include a secure runtime environment that facilitates achieving native code performance for untrusted program code without significant risk of unwanted side effects. This secure runtime environment facilitates native code modules that are otherwise securely isolated from the other software and hardware components of a computing device to communicate with other system components in a secure, controlled manner. The secure runtime environment moderates both which resources can be accessed (and communicated with) by the native code module, as well as how such resources are accessed, thereby ensuring that the native code module relies entirely on the secure runtime environment to access system services and cannot perform sensitive operations without explicit mediation.

5. Variations and Optimizations

Some embodiments of the described system may incorporate a range of variations and optimizations. Some variations may improve performance, reduce overhead or complexity, and/or allow native code modules to be safely executed on a wider range of computing devices (e.g., on computing devices with different instruction set architectures). For instance, some embodiments may make use of additional hardware features of a computing device to reduce the overhead of executing native code modules.

The following sub-sections describe a number of hardware and software variations and/or optimizations that can be used to facilitate and/or enhance the safe execution of native code modules.

5.1 Additional Distribution Formats for Native Code Modules

While compiling native code modules into binaries customized for a single instruction set sacrifices instruction-set portability, using architecture-specific native code can also provides substantial benefits with respect to improving performance and reducing the size and complexity of the system. For situations where multiple popular operating systems share the same underlying hardware architecture, a substantial percentage of systems may be able to take advantage of such a native code module, despite the lack of instruction-set portability.

Some embodiments provide native code modules that use the native code of other instruction set architectures. In some embodiments, the system may support "fat binaries" for native code modules, which include multiple machine code versions that support different instruction set architectures in the same native code module package. Alternatively, the system may use a binary translator in the loader that supports instruction set portability. As described previously, architectures that do not support hardware-based segmented memory protection may need to use alternative data sandboxing techniques to ensure data integrity.

Some embodiments can support different (or multiple) executable formats. Such options facilitate developing native code modules by allowing developers to choose from a wider range of preferred development tools. Some embodiments support both dynamically-loaded libraries in addition to statically-linked binaries.

In some embodiments, the native code module can be distributed using a distribution format that is based on the intermediate representation used by a compiler (e.g., an intermediate representation used by an open-source compiler). This architecture-neutral intermediate representation can then be dynamically re-targeted for the architectures of receiving computing devices. For instance, the secure runtime environment on a receiving computing device may perform additional code-generation operations that transform the intermediate code for the native code module into native code instructions for the computing device. Note that such techniques allow native code modules to be distributed in a single "portable" binary form that can execute efficiently on multiple different architectures.

In some embodiments, the validator checks whether native code modules attempt to use processor-model-specific instruction set extensions (such as different versions of the SSE (Streaming SIMD Extensions) available on some processors). While restricting the use of such instructions may simplify aspects of the validator, this could also potentially limit the performance of native code modules. Therefore, to provide maximum performance, the system may support such extensions by checking (e.g., in the validator) whether any extensions used in a native code module are supported by the hardware of the computing device (e.g., by checking detailed product model and version information, such as a model, model number, and stepping for current processors, to determine the set of supported instructions).

For instance, the validator may enforce safety for a native code module by preventing the execution of instructions that are unsupported by and/or undefined for the available hardware of a specific computing device. Because the system is responsible for safety, but the developer is responsible for correctness and performance of the actual program, the validator may in some embodiments simply overwrite unsupported instructions with halt instructions, thereby stopping execution (and preserving security) in the case that an unsupported instruction is found for a computing device. Note that while using the halt instruction, which has a one-byte size some instruction set architectures, may simplify the implementation of such instruction replacement techniques, other single-byte and/or multi-byte instructions may also be used with similar effect.

5.2 Hardware Support for Aligned Control Flow Operations

As mentioned previously, some embodiments ensure control flow integrity by limiting the set of instructions that can be control flow targets. As described, the system may only allow specified byte boundaries to serve as control flow targets, and ensure that the instructions in the native code module are aligned such that all control flow targets conform with this requirement (e.g., by being aligned to such specified byte boundaries). In the above-described embodiments the system achieves such alignment during compilation by inserting pseudo instructions and/or no-op instructions which precede control flow targets during compilation. The system then re-confirms in the validator that instructions in the native code module are properly aligned and that all indirect control flow instructions in the native code module use the required pseudo instructions.

In some embodiments, the system includes a masking mechanism in the processing element of the computing device that can mask one or more bits of a target memory address during a control flow change. During operation, the system uses this masking mechanism to ensure that a control flow change in the native code module can only target a restricted set of byte boundaries.

For instance, the masking mechanism may include a set of bit-level hardware masking elements that manipulate a computed jump target address being fed into the next instruction pointer of the processing element. In some embodiments, the system masks a specified number of bits using the masking mechanism to ensure that the address for the next instruction to be accessed is aligned to a specified byte boundary. Alternatively, the system may mask other bits in target addresses to specify other subsets of instruction boundaries.

Figure 9:
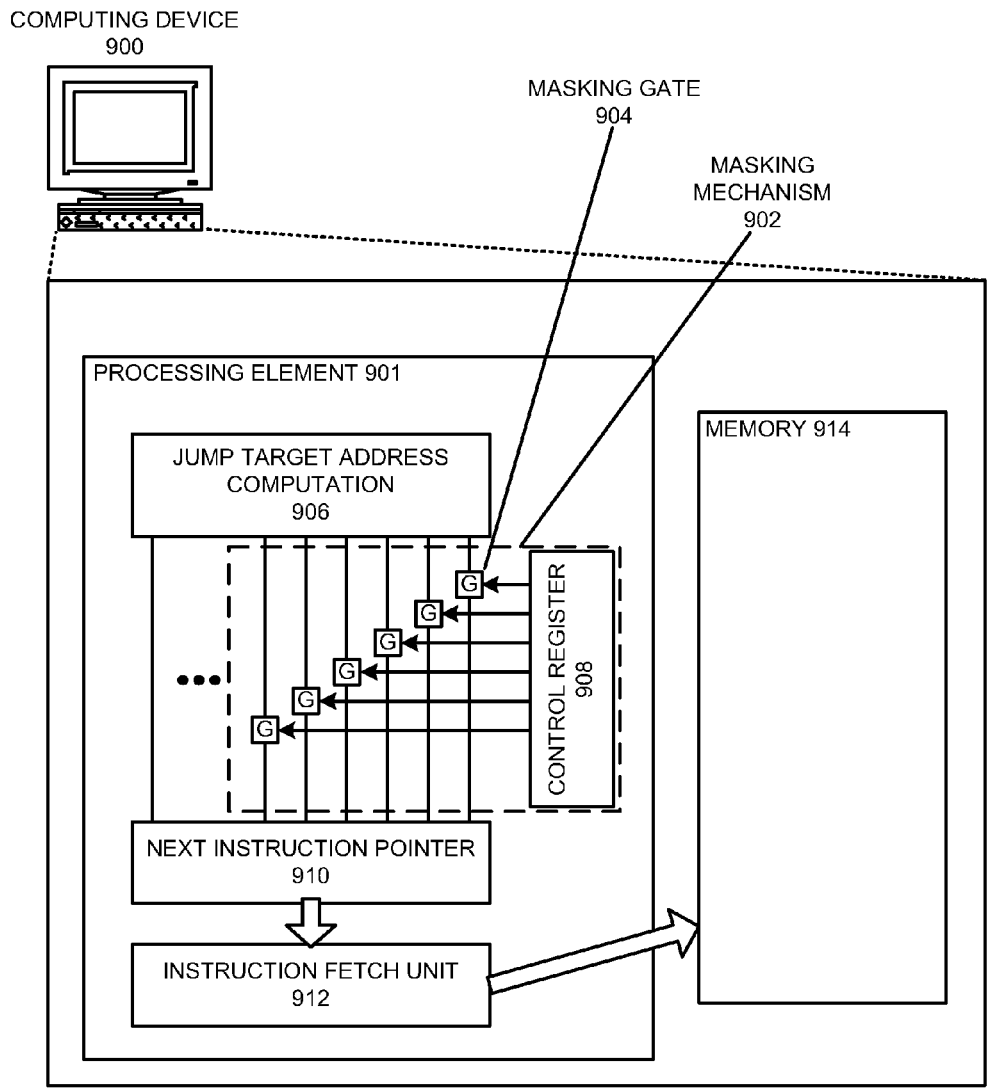
FIG. 9 illustrates a computing device that contains a processing element with a masking mechanism.

FIG. 9 illustrates a computing device 900 that contains a processing element 901 with a masking mechanism 902. A set of masking elements (such as masking gate 904) can be configured such that one or more bits output by a jump target address computation 906 are masked to zero values. For instance, the set of bits that are masked may be determined using a control register 908 that controls the masking elements. The system can configure control register 908 to ensure that the target memory address received by next instruction pointer 910 is aligned to a specified byte boundary. The instruction fetch unit 912 can then proceed to fetch the instruction at the target memory address from the memory hierarchy (e.g., memory 914).

Note that using such a masking mechanism obviates the need to insert pseudo instructions into the native code module for indirect control transfers; instead, the native indirect control flow instructions, enhanced with the hardware masking mechanism, can be used. Previously, the system needed to include at least an additional (masking) logical and instruction prior to control flow instructions (see FIGS. 2, 3A and 3B) to ensure that the control flow target was always aligned to a specified byte boundary. Because the hardware of the masking mechanism provides a similar guarantee of alignment, the logical and instructions in the pseudo instructions become redundant, and can be eliminated (e.g., only the original control transfer instruction is needed).

Furthermore, using the masking mechanism can reduce the overhead needed to handle more complex control flow operations and/or enable the use of control flow operations that might otherwise need to be disabled. For instance, because the masking is performed in hardware, at the time when the jump target address is actually computed, it can guarantee that the target address for a return instruction will be correctly byte-aligned, and is hence not vulnerable to the previously-described stack race condition that might otherwise sometimes lead to a jump to a non-byte-aligned target address.

Figure 10:
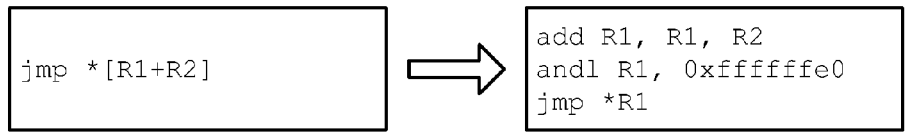
FIG. 10 illustrates an exemplary control flow instruction for which using a masking mechanism reduces overhead.

FIG. 10 illustrates an exemplary control flow instruction for which using a masking mechanism reduces overhead. In the preceding sections, a control flow instruction containing complex addressing (e.g., a jump instruction whose target is the sum of the contents of two registers, as shown in the left of FIG. 10) would need to be either disallowed or expanded into a sequence of instructions that first compute the target as an intermediate value and then ensure that the intermediate value is properly byte-aligned (as illustrated by the right instruction sequence in FIG. 10). Using a hardware masking mechanism eliminates the need for the additional instructions, because the target address is automatically aligned to a byte boundary by the masking mechanism after the addressing has been resolved (e.g., the processing element has summed the contents of the two registers).

In some embodiments, using the masking mechanism can provide a number of performance benefits. As described above, using the masking mechanism provides support for a number of control flow instructions and/or operations that might otherwise need to be disallowed or be modified to involve additional overhead. Moreover, eliminating the pseudo instructions from the native code module reduces the code size of the native code module by removing the need for inserted logical and instructions and intermediate instructions (e.g., removing the pseudo instructions facilitates shorter code paths for indirect control flow transfers). Additionally, removing the need for these instructions improves caching performance (due to reduced code size), and will typically slightly reduce the total number of no-op instructions (padding) that the compiler will need to insert to align the set of control flow targets in the native code module.

Furthermore, because these pseudo instructions need to use valuable scratch registers to perform intermediate calculations, eliminating these instructions provides performance benefits by reducing register pressure (e.g., removing the need to back up otherwise-used registers so that they can be used as scratch registers in pseudo instructions). Moreover, note that the insertion of additional logical and/or intermediate instructions can cause unintended side effects for the native code module. For instance, in some instruction set architectures, such instructions may have multiple destinations that include an "eflags" register as well as a standard target register, where the eflags register stores condition information describing the results of the instruction that can be used to make decisions in subsequent instructions.

If a subsequent instruction in the native code module makes use of such condition information, a compilation tool chain attempting to maintain transparent program operation for the native code module may need to insert additional instructions that ensure that the condition information is saved across the inserted pseudo instructions (or repeat the preceding instructions to re-generate the condition information). Finally, using the masking mechanism to ensure that all control flow operations are aligned simplifies the set of modifications needed in the compilation tool chain, which otherwise needs to account for all of the above situations.

Note that the masking mechanism can be configured to mask only a subset of the bits of a target address. For instance, while in some embodiments the masking mechanism may allow an arbitrary number of bits to be set to zero (e.g., bits 0-31 on a 32-bit machine, or bits 0-63 on a 64-bit machine), the system may only need masking functionality to be available for a limited set of bits.

For example, if native code modules are known to never need to align to a coarser granularity than 64-byte boundaries, the masking mechanism may be configured to only be able to mask the six low-order bits of target addresses, thereby reducing the design complexity and the number of transistors needed to implement the masking mechanism. Note that a masking mechanism configured to mask the five low-order bits of a target address would provide the same effect as the pseudo instructions illustrated in FIG. 3A, which ensure that control flow targets are aligned to 32-byte boundaries.

The masking mechanism may also include a control register that can be used to control the set of bits in the target address that are masked as well as to enable and/or disable the masking mechanism. For instance, in some embodiments different native code modules (or different versions of a native code module) may be compiled to be aligned to different granularities of byte boundaries. In this case, the validator and/or service runtime can detect the granularity of alignment, and can configure the control register to enforce the specified alignment properties for control flow targets. In some embodiments, this control register can be accessed via user-level instructions, to allow user-level processes (such as a web browser) to use the masking mechanism to provide alignment guarantees.

The system may also only apply masking operations to a subset of control transfers. For instance, the system might only perform masking for data-dependent control transfers where the transfer target is not encoded in an immediate data operand of the instruction opcode (e.g., the mask would only be applied to transfers that use register contents or stack contents to determine the control transfer target). In some cases, different ways of determining the control transfer target may use different instruction opcodes, in which case the system may determine whether or not to mask a given target address based on the opcode of the control transfer instruction being used.

Furthermore, the system may include two instruction opcodes for an instruction type (e.g., way of determining the control transfer target), where one of the instruction opcodes is subject to masking the other is not. In such embodiments, program code for the secure runtime environment may use the non-masked instructions, while the system ensures that the untrusted code of the native code module can only use masked versions of the instructions.

Note that the system needs to be able to adjust the masking mechanism to enforce a desired granularity of alignment for a native code module while also guaranteeing that the native code module itself cannot change settings for the masking mechanism and thereby compromise system security. To ensure that the native code module cannot influence or disable the masking mechanism, the validator may be configured to disallow any native code modules that include instructions that attempt to configure and/or disable the masking mechanism (or, alternatively, replace any such instructions in the native code with no-op instructions). The system can enable the masking mechanism prior to transferring control to the native code module, and disable the masking mechanism when exiting the native code module (e.g., in the trampoline instructions, or after exiting the trampoline region).

Figure 11:
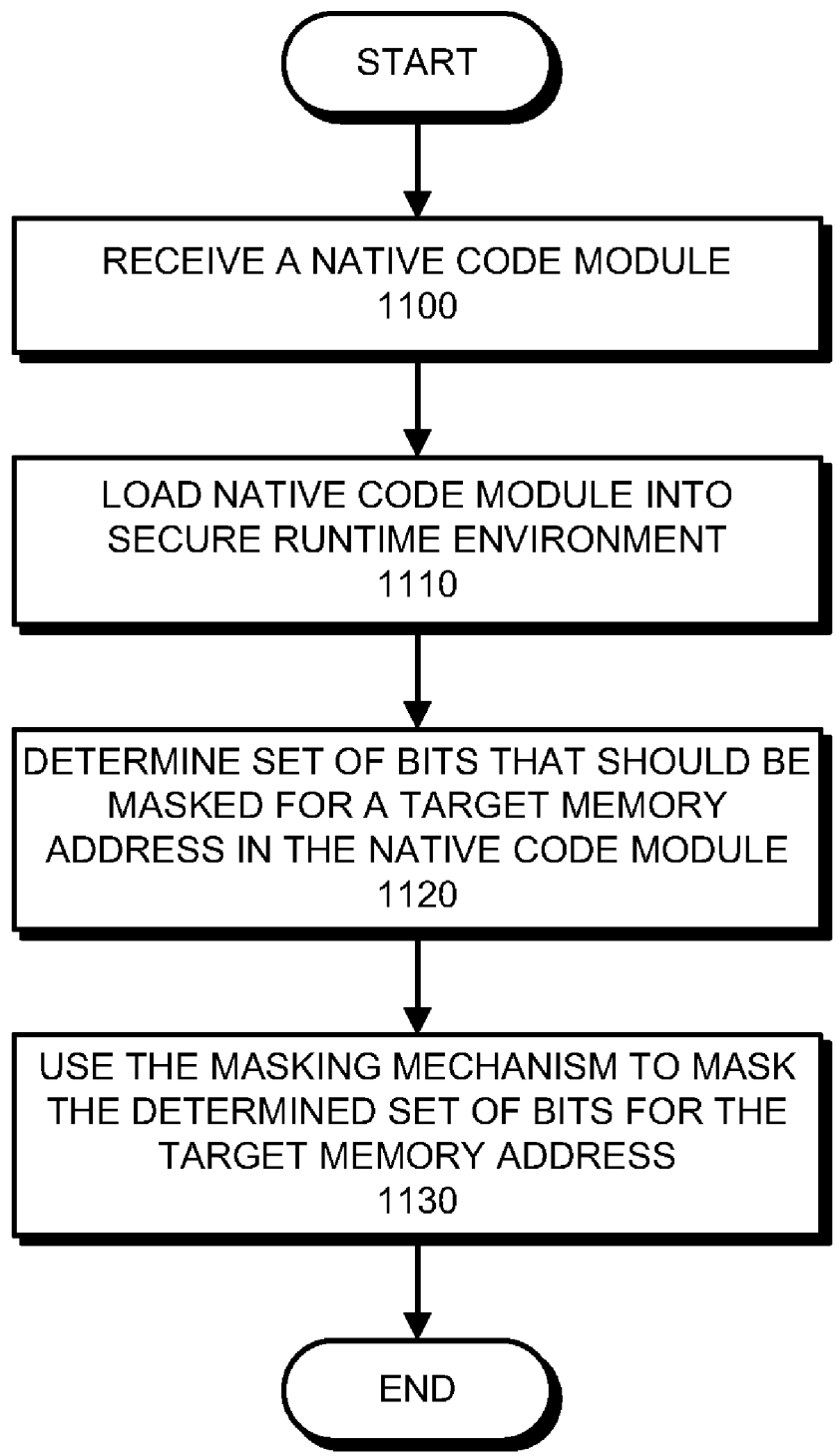
FIG. 11 presents a flowchart illustrating the process of using a masking mechanism to safely execute a native code module on a computing device.

FIG. 11 presents a flowchart illustrating the process of using a masking mechanism to safely execute a native code module on a computing device. Note that the computing device includes a processing element and a memory, and that the processing element includes the masking mechanism. During operation, the system receives the native code module (operation 1100), which comprises untrusted program code that is expressed using an instruction set architecture associated with the computing device. The system loads the native code module into a secure runtime environment (operation 1110).

The system then determines a set of bits that need to be masked for a target memory address in the native code module in order to ensure that the target memory address is aligned to a specified byte boundary (operation 1120). The system then uses the masking mechanism to mask the determined set of bits for the target memory address (operation 1130). The system uses the masking mechanism to enforce alignment for control flow targets in the native code module, thereby ensuring that control flow changes for the native code module can only reach a set of specified byte boundaries.

In summary, some embodiments use a masking mechanism that enforces target address alignment for control flow instructions in the untrusted program code of the native code module. This masking mechanism facilitates aligning target memory addresses to an aligned byte boundary without requiring additional alignment-checking instructions to be inserted into the native code module, thereby simplifying the compilation process and improving performance of the untrusted native code module.

5.3 Support for User-Level Segmentation

As mentioned previously, some embodiments use hardware memory segmentation support to ensure data integrity and control flow integrity for a native code module. Memory segments can be manipulated using a set of instructions and registers that establish a base address and bounds for a given memory segment, with the hardware ensuring that memory accesses are limited to addresses between the base address and the bounds of the memory segment.

5.3.1 Memory Segmentation

Figure 12:
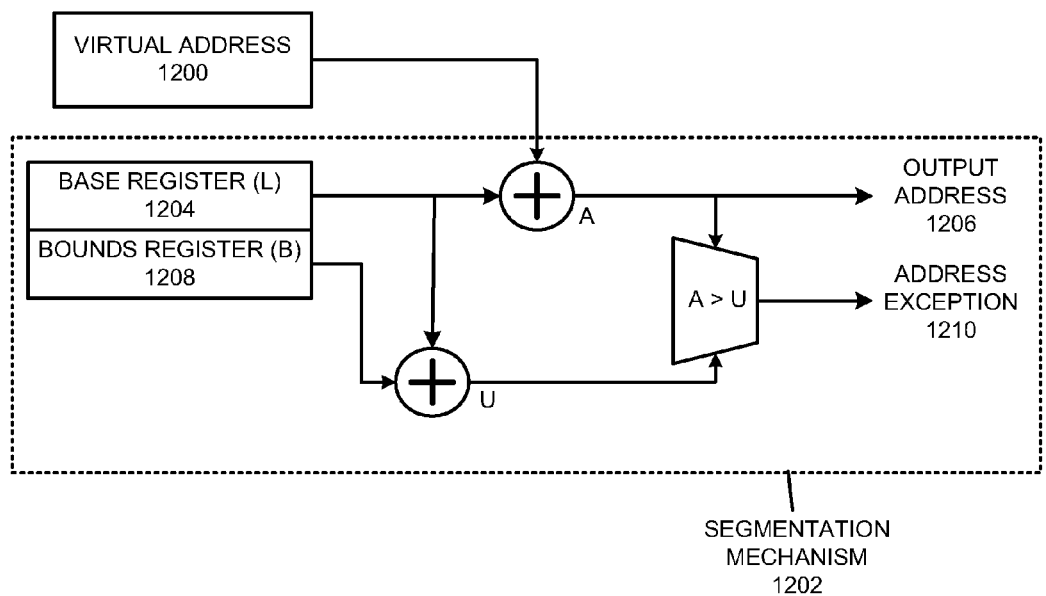
FIG. 12 illustrates a base/bounds address translation mechanism that enables memory segmentation.

FIG. 12 illustrates a base/bounds address translation mechanism that enables memory segmentation. While interpreting an instruction, the system generates a virtual address 1200, which may be either an instruction or data address. The system passes virtual address 1200 to segmentation mechanism 1202, which includes a pair of registers that specify the base and bounds for the memory segment and several computation units. Base register 1204 defines the lowest address (or "lower bound," L) for the current memory segment, while bounds register 1206 defines the length (or "bound," B) of the memory segment.

While converting virtual address 1200 to a physical address, segmentation mechanism 1202 adds the contents of base register 1204 to virtual address 1200 using an unsigned arithmetic add operation. The resulting output address 1206 ("A") can be used as a physical address, or may be further translated (e.g., in the case of paged virtual memory systems, such as for the 80386 processor).

Segmentation mechanism 1202 also computes the highest valid address for the memory segment by summing the contents of base register 1204 and bounds register 1208 (resulting in the upper bound address, "U"). A comparator is used to ensure that the output address 1206 does not exceed the upper bound address, and generates an address exception 1210 whenever the condition fails. The illustrated address translation mechanism guarantees that output addresses are in the range [L,U], and can be used to ensure that read and write instructions access data addresses within the range and that control transfers (e.g., sequencing and control transfer instructions such as jmp, call, ret, etc.) target addresses within the range.

Note that the processing of address exceptions can be handled using user mode control transfers and/or standard hardware exception handling techniques. Note also that the described segmentation mechanism can be extended to enforce more specific permissions (e.g., read, write, and/or execute permissions) and/or privilege checks in addition to the described address range check.

Unfortunately, not all processing elements include segmented memory support. Furthermore, hardware implementations that support segmented memory only allow such hardware functionality to be accessed by privileged instructions. For instance, such functionality may be restricted to only be accessible from the operating system of a computing device. While the operating system may expose aspects of this functionality to user-level applications (e.g., via a system-call interface), there is no guarantee that such access will be provided.

Hence, even if the hardware supports segmented memory, user-level applications may not be able to make use of such functionality without explicit operating system support. Such scenarios can complicate and negatively impact the safe execution of untrusted native code modules, because the system typically will need to fall back to data reference sandboxing techniques that instead ensure data integrity and control flow integrity via software fault isolation, which can involve substantial additional performance overhead.

5.3.2 An Exemplary Implementation of Memory Segmentation

Figure 13:
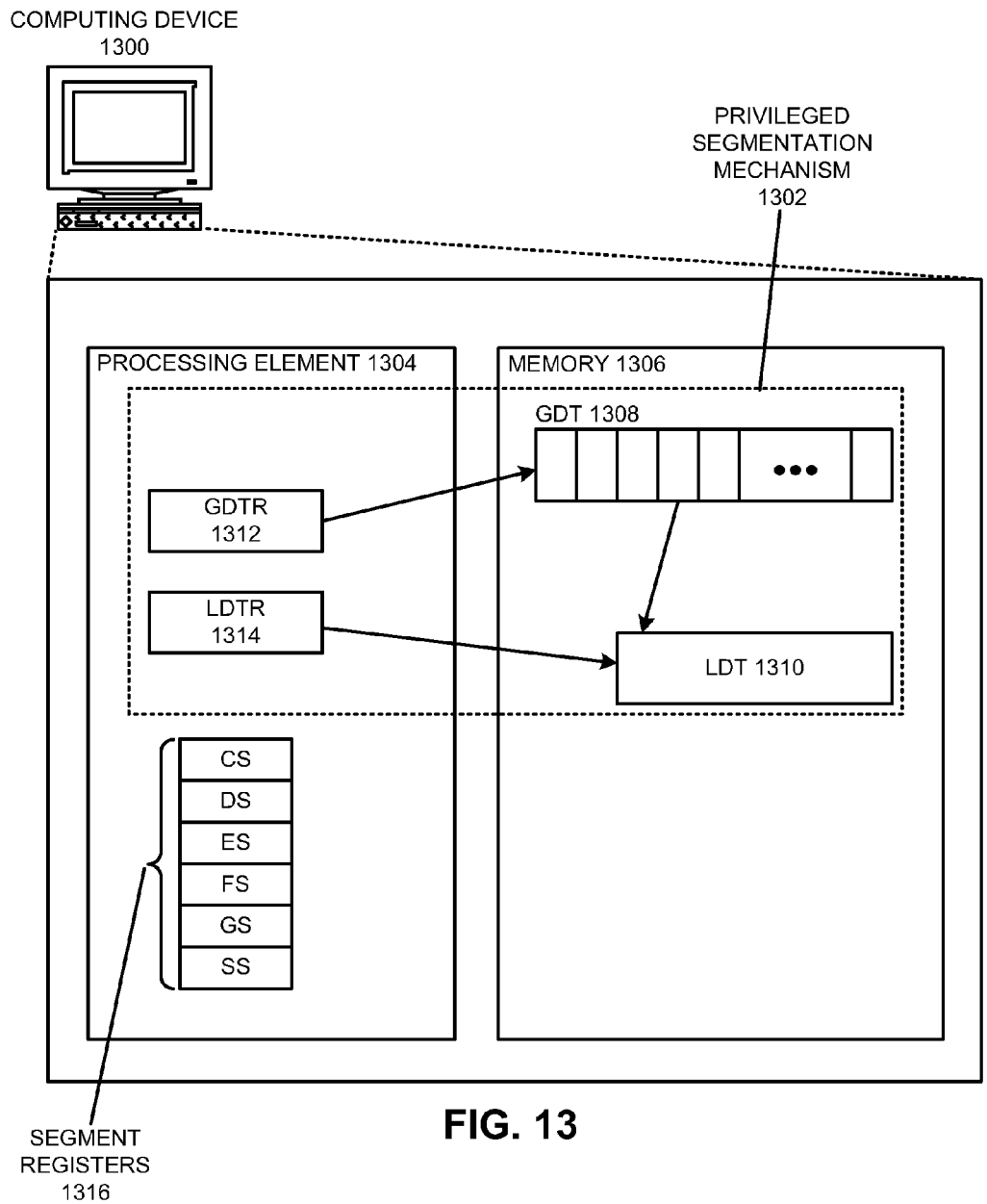
FIG. 13 illustrates an exemplary computing device that provides segmented memory support using a set of privileged segmentation mechanisms.

FIG. 13 illustrates an exemplary computing device 1300 that provides segmented memory support using a privileged segmentation mechanism 1302. Note that privileged segmentation mechanism 1302 is substantially similar to that found in the x86 architecture.

Computing device 1300 includes a processing element 1304 and an associated memory 1306. A privileged segmentation mechanism 1302 manages a set of descriptors that describe the set of memory segments being used in computing device 1300 using a memory-based approach that includes two tables, GDT (Global Descriptor Table) 1308 and LDT (Local Descriptor Table) 1310. GDT 1308 contains a list of descriptors that describe the memory segments currently defined for computing device 1300, where each descriptor includes information that describes the characteristics of a given memory segment or set of memory segments. For instance, a descriptor in GDT 1308 may point to LDT 1310, where LDT 1310 contains a set of descriptors describing the memory segments being used by a given process. Note that GDT 1308 and LDT 1310 can be referenced during operation using two registers, GDTR (the Global Descriptor Table Register) 1312 and LDTR (the Local Descriptor Table Register) 1314, which are (in the x86 architecture) initialized using two privileged instructions, LLDT and LGDT.

Conceptually, these tables provide multiple instances of lower and upper bound values (referred to as selectors) that can be loaded into base and bounds registers. Processing element 1304 also includes a set of segment registers 1316 that support the simultaneous use of multiple segments for different aspects of a process (e.g., a code segment (CS), a data segment (DS), a stack segment (SS), an extra segment (ES), and two general-purpose segments (FS and GS)). Note that privileged segmentation mechanism 1302 can be used in a range of ways to support memory segments.

In one example, the system may perform a number of actions when creating memory segments for a new process that include: (1) using GDTR 1312 to get the location of GDT 1308; (2) allocating a memory range for a new LDT for the process (e.g., LDT 1310); (3) creating a new descriptor for the process in GDT 1308 that includes a pointer to LDT 1310; (4) storing a pointer to LDT 1310 in LDTR 1314; (5) storing a set of base and bounds pairs associated with memory segments in LDT 1310; and (6) loading the base and bounds pairs from LDT 1310 into associated segment registers 1316 while executing instructions for the process, so that processing element 1304 performs the desired address translations (and checks). Note that the system will typically load the contents of different LDTs and/or GDT 1308 entries into segment registers 1316 following a context switch, so that the processor state reflects the memory segments of the newly switched-in process.

Note that GDT 1308 and LDT 1310 are typically both maintained in memory in the (privileged) kernel address space, which is not accessible by user-level instructions, and that the instructions used to access GDTR 1312 and LDTR 1314 are privileged instructions that cannot be executed at the user level. While user-level instructions can be used to change the values in segment registers 1316, storing values in segment registers 1316 does not have any effect until LDTR 1314 has been initialized by the operating system. Furthermore, many of the initialization steps described above for privileged segmentation mechanism 1302 may involve kernel operations. Hence, the system typically cannot configure or access memory segment functionality without operating system support.

5.3.3 Supporting User-Level Segmentation

The system can also include a user-level segmentation mechanism that allows memory segments to be created and controlled entirely from the user-level (e.g., using user-level instructions) without requiring the use of privileged instructions or other operating system support. This user-level segmentation mechanism may involve additional hardware and/or software structures not found in existing segmentation techniques. For instance, the system may include an additional table, the "user descriptor table," (UDT) that contains memory segment descriptors and can be accessed using an additional user-level register, the "user descriptor table register" (UDTR).

Note that creating memory segments from the user-level may involve additional user-level machine instructions and/or machine instruction variants that initialize base and bound registers from unprivileged user-level code (unlike privileged segmentation mechanism 1302, which ensures that segment registers 1316 are loaded using a selector from the privileged GDT 1308 or LDT 1310). Values can then be loaded into segment registers 1316 in substantially the same way that other existing instructions load registers. Such user-level access allows trusted user-level code to create and manage memory segments which can then be used to constrain untrusted user-level code, thereby ensuring that they execute safely.

Figure 14:
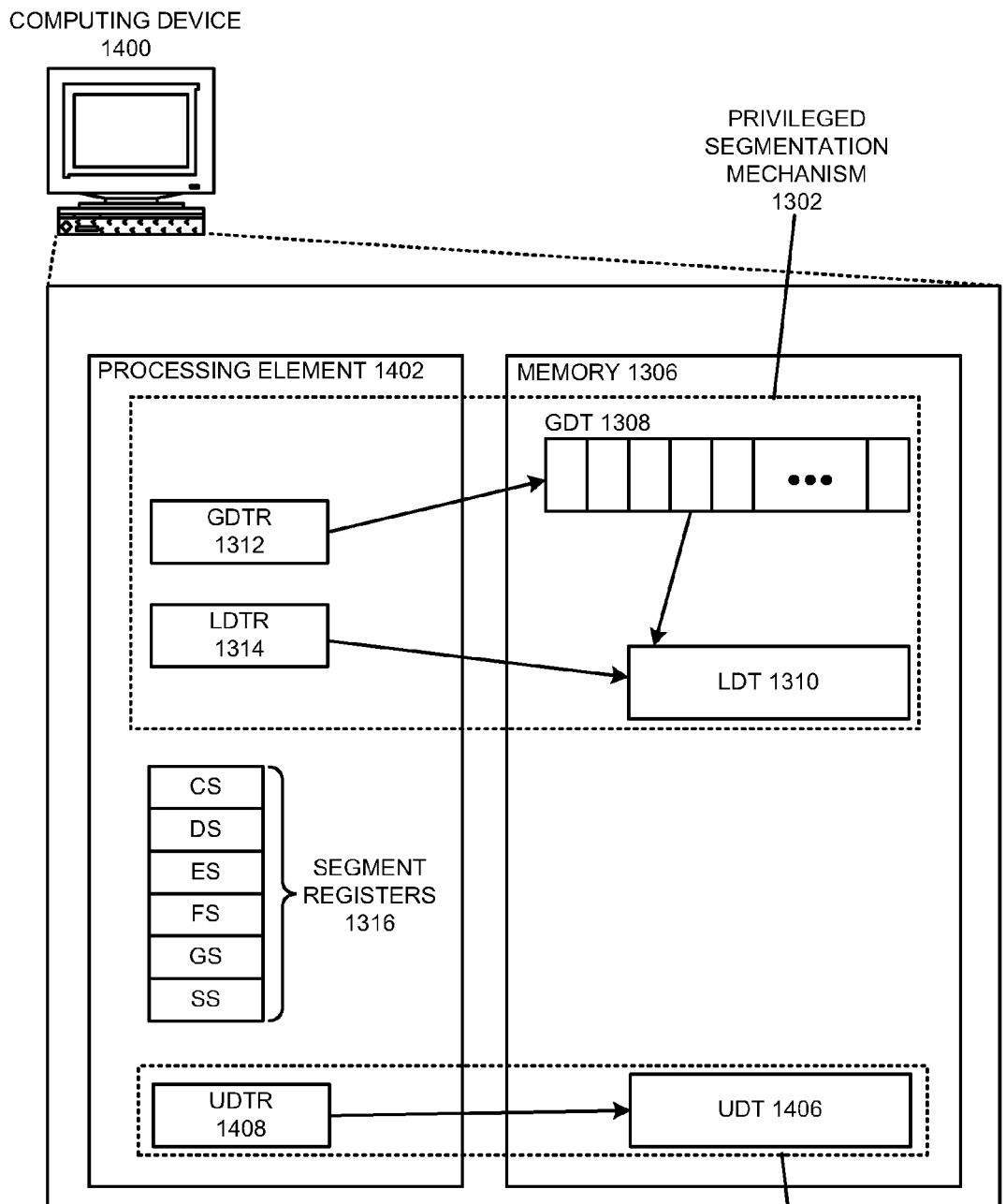
FIG. 14 illustrates an exemplary processing element that has been extended to also include a user-level segmentation mechanism.

FIG. 14 illustrates an exemplary computing device 1400 that includes a processing element 1402 that has been extended to also include a user-level segmentation mechanism 1404. User-level segmentation mechanism 1404 includes a new segment descriptor table, UDT 1406. UDT 1406 can be similar in format to LDT 1310, but resides in user memory, and can be referenced using a UDTR (user descriptor table register) 1408 which can be initialized via a user-level LUDT (load user descriptor table) instruction.

Unlike the LLDT instruction, which takes a segment selector that must be a valid GDT 1308 or LDT 1310 entry, the LUDT instruction can take a full segment descriptor from a register, and does not require a corresponding entry in GDT 1308. Note that user-level instructions can read and write descriptors in UDT 1406. Note that UDTR 1408 is part of the task segment, and hence needs to be saved and restored during context switches (similarly to LDTR 1314 and other process-specific registers).

Note also that the addresses used in UDT descriptors are addresses in the user space of the current process. Controlling access to memory using the UDT can only restrict the addresses accessed by the process, and does not modify any page tables or GDT entries (if present in the given hardware) associated with the current process. Hence, memory segments defined via a UDT descriptor are still subject to operating system page protections.

Note that while user-level segmentation mechanism 1404 as illustrated in FIG. 14 is implemented in conjunction with the privileged segmentation mechanism 1302 of the x86 architecture (from FIG. 13), this joint implementation is not required. For instance, user-level segmentation mechanisms can also be implemented in a stand-alone manner for instruction set architectures that do not include any existing support for memory segments, such as a RISC architecture (e.g., a modified MIPS R2000/R3000 or ARM processor). Note that adding support for user-level memory segmentation in a RISC architecture may involve the addition of basic segmentation structures into the data path and/or instruction fetch path of a RISC processing element.

Figure 15A:
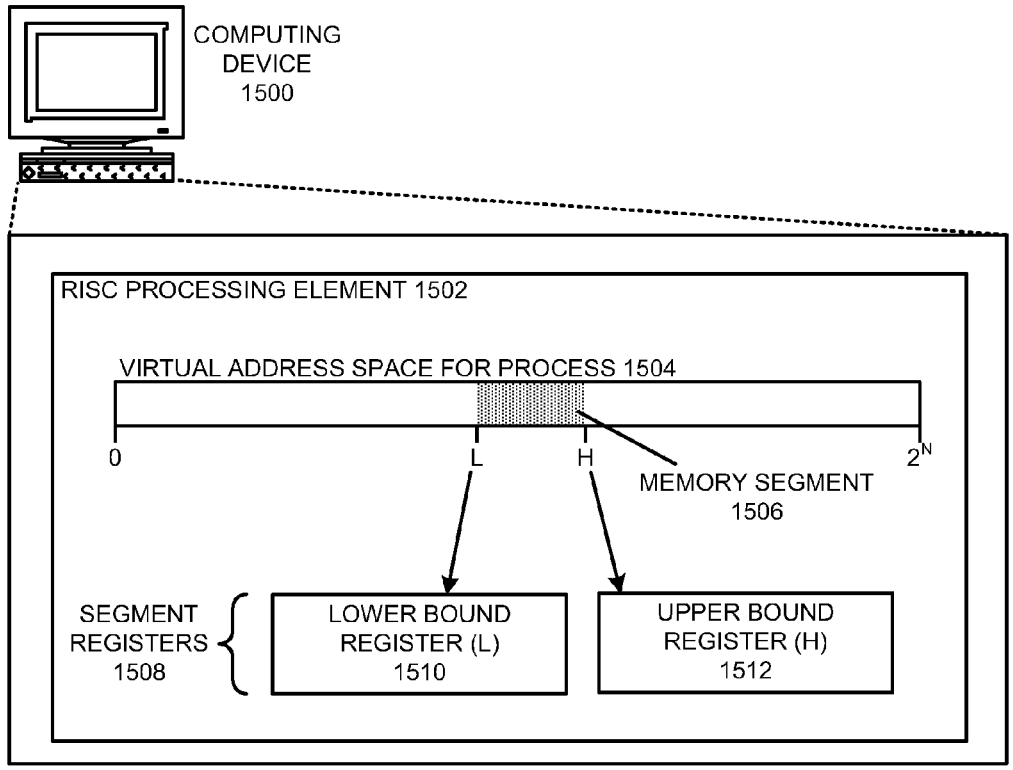
FIG. 15A illustrates the virtual address space for a process executing on a computing device.
Figure 15B:
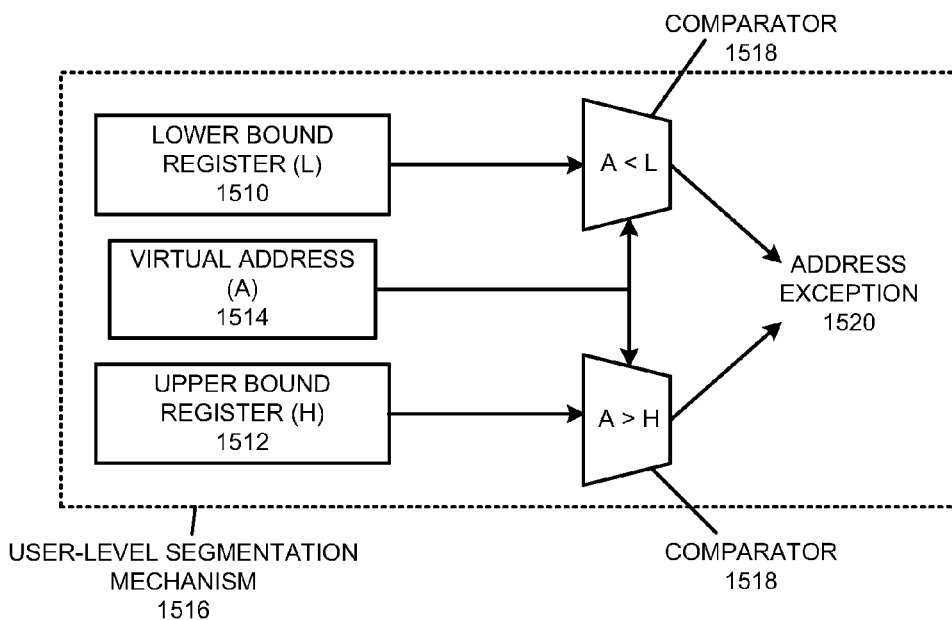
FIG. 15B illustrates an exemplary user-level segmentation mechanism for a RISC processing element.

FIGS. 15A-15B illustrate the use of an exemplary user-level segmentation mechanism 1516 for a computing device 1500 with a RISC processing element 1502. FIG. 15A illustrates the virtual address space for a process 1504 executing on the computing device 1500. This process perceives a virtual address space 1504 that begins at memory address zero, and ends at some memory bound $2^N$. The process (or a set of threads in the process) may be restricted to accessing a given memory segment 1506 using a set of segment registers 1508 that track the lower bound (L) 1510 and upper bound (H) 1508 for the memory segment 1506. Note that in some embodiments, RISC processing element 1502 may support special user-level instructions that need to be used to access segment registers 1508. Alternatively, segment registers 1508 may be accessed in the same manner as other registers in RISC processing element 1502.

FIG. 15B illustrates an exemplary user-level segmentation mechanism 1516 for RISC processing element 1502. When the process (described for FIG. 15A) accesses a virtual address (A) 1514, user-level segmentation mechanism 1516 uses two comparators 1518 to compare memory address A with the lower and upper bounds for memory segment 1506 stored in registers 1510 and 1512, respectively. If user-level segmentation mechanism 1516 is active and virtual address 1514 is outside of memory segment 1506, user-level segmentation mechanism 1516 detects that virtual address 1514 is outside of memory segment 1506, and returns an address exception 1520. Otherwise, the memory access is allowed to proceed normally.

Note that unlike the exemplary user-level segmentation mechanism 1202 shown in FIG. 12, user-level segmentation mechanism 1516 does not perform address translation and/or any addition operations, but can instead use comparators 1518 in parallel with the access to confirm that virtual address 1514 falls within memory segment 1506. Hence, the memory segment check can be implemented without adding additional delay into the critical path of instruction fetch for the common (successful) case.

In some embodiments, RISC processing element 1502 may include multiple sets of segment registers 1508 and mode bits that are used to determine whether segment registers 1508 are currently being used to define (and enforce) memory segments. Alternatively, in alternate implementations without mode bits, segment registers 1508 may default to a lower bound of zero and an upper bound of $2^N$ when more restrictive memory segments are unneeded, thereby allowing full access to the virtual address space for the process unless otherwise configured.

5.3.4 Using User-Level Memory Segmentation

In order to safely execute untrusted native code modules, the service runtime needs to be able to ensure that untrusted code cannot change settings for memory segments. In some embodiments, the user-level segmentation mechanism includes one or more status and/or user-level configuration bits. For instance, the mechanism may include an enable bit that limits the ability to create and/or configure memory segments, and a status bit that indicates whether the user-level segmentation mechanism can presently be configured. In addition, the mechanism may include a feature bit that indicates whether the processing element supports user-level memory segmentation.

To ensure that the native code module cannot influence or disable the user-level segmentation mechanism, the validator may be configured to disallow any native code modules that include instructions that configure and/or disable the user-level segmentation mechanism (or, alternatively, replace any such instructions in the native code with no-op instructions), thereby guaranteeing that untrusted code modules cannot exceed or modify the bounds of their memory segments. As a result, the secure runtime environment can ensure that memory segments cannot be affected by user-level instructions in the untrusted code module by unsetting the enable bit prior to transferring control to the native code module, and then re-enabling the enable bit when exiting the native code module (e.g., in the trampoline instructions, or after exiting the trampoline region).

Note that processing elements that simultaneously support multiple types of segmentation mechanisms (e.g., segmentation mechanisms that support both UDTs and LDTs) may include additional configuration mechanisms that facilitate loading segment registers from either mechanism. For instance, in one scenario a processing element may be configured to generally use the UDT instead of the LDT whenever the UDT is enabled. However, some legacy code libraries may include program code that accesses LDT functionality (e.g., via an operating system call). In this case, the service runtime may need to toggle off UDT support to enable the legacy code to access the desired LDT functionality. Note that the use of a UDT/LDT entry starts during the load of a segment register (e.g., whenever an LDS, LES, LFS, LGS, LSS, a pop DS/ES/FS/GS/SS, far call, far jump, or return instruction executes), at which point the system needs to select whether to use the UDT or LDT.

Figure 16:
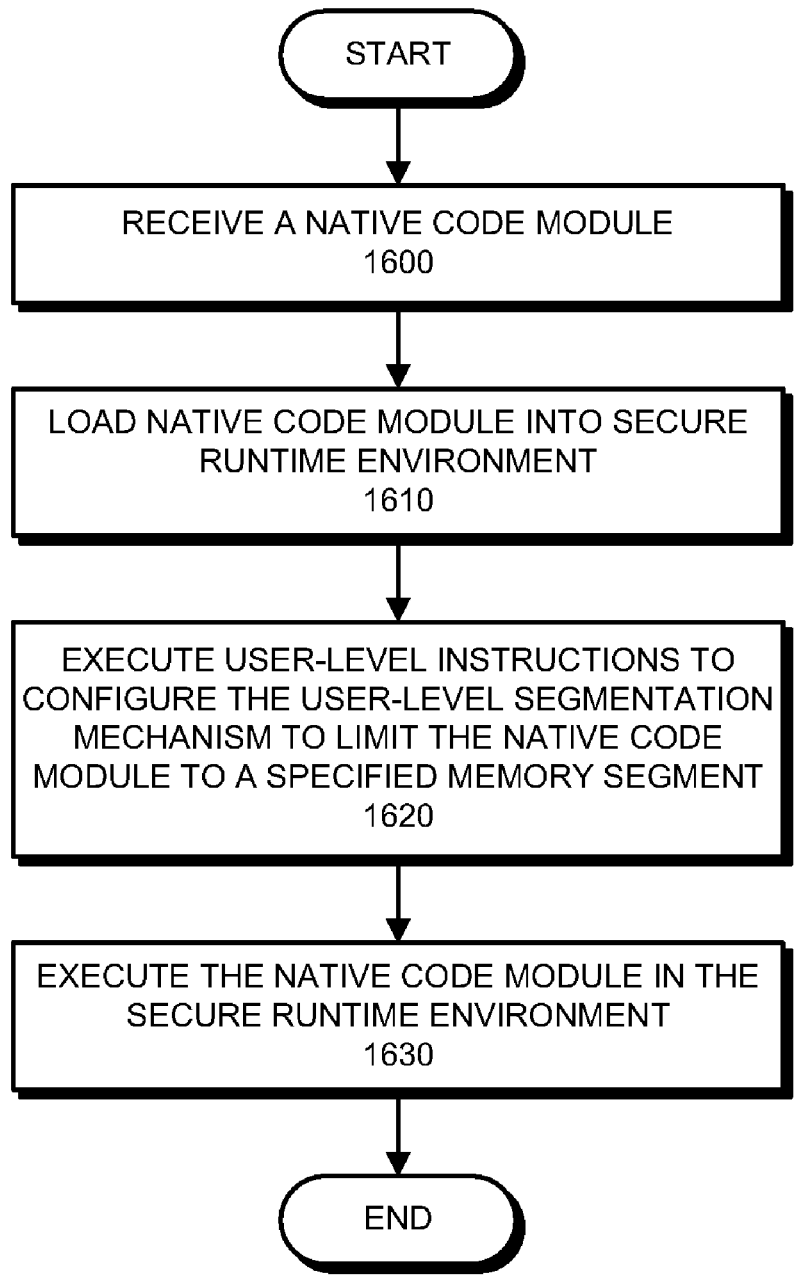
FIG. 16 presents a flowchart illustrating the process of using a user-level segmentation mechanism to safely execute a native code module on a computing device.

FIG. 16 presents a flowchart illustrating the process of using a user-level segmentation mechanism to safely execute a native code module on a computing device. Note that the computing device includes a processing element and a memory, and that the processing element includes the user-level segmentation mechanism. During operation, the system receives the native code module (operation 1600), which comprises untrusted program code that is expressed using an instruction set architecture associated with the computing device. The system loads the native code module into a secure runtime environment (operation 1610).

The system then executes one or more user-level instructions from the instruction set architecture in the secure runtime environment to configure the user-level segmentation mechanism to limit the native code module to accessing only a specified segment of the memory (operation 1620). The system next executes the native code module in the secure runtime environment (operation 1630).

In some embodiments, the system facilitates creating and managing memory segments using user-level instructions instead of privileged instructions and/or operating system support. These techniques allow segmented memory protection for operating systems that choose to not include readily-available mechanisms for creating memory segments, and allows segmented memory protection to be portably implemented across operating systems. For instance, while some operating systems running on a common hardware platform may all support user-level segmentation, they all have different system call interfaces for creating segment descriptors. Moving such segmentation mechanisms to the user-level facilitates uniform access across operating systems. Finally, making such mechanisms accessible from the user level facilitates the safe execution of untrusted native code modules without requiring operating system support.

In summary, existing techniques for executing untrusted program code typically sacrifice some aspects of programmability, safety, operating system portability, and/or performance. Some embodiments use hardware and software fault isolation techniques to facilitate executing an untrusted native code module safely and securely on a given set of hardware, thereby protecting a host process and the rest of the host device from malicious behavior by the untrusted module while providing performance which is substantially similar to native code performance.

Safe execution of the native code module is achieved via load-time validation and a secure runtime environment, where the validator ensures that a native code module is compliant with a set of instruction restrictions and alignment requirements, and the secure runtime environment moderates both which resources can be accessed (and communicated with) by the native code module as well as how such resources are accessed. Hardware support for aligning control flow operations and providing user-level memory segmentation can further facilitate the safe execution of native code modules. In one application of these techniques, web-based applications using the described techniques can execute with native performance while resolving the security and portability issues of existing techniques.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computing device that uses masking to safely execute native code, comprising:
   a processing element that executes the native code; and
   a memory configured to store code and data for the processing element; and a masking mechanism within the processing element that masks one or more bits of a target address during a control flow transfer to transfer control to a restricted set of aligned byte boundaries in the native code, wherein the masking mechanism is configured to mask the target address for a subset of control transfer instructions, and wherein the masking mechanism determines whether to mask the target address of a control flow instruction based on at least one of an instruction opcode or a type of address encoding for the control flow instruction.

2. The computing device of claim 1, wherein the masking mechanism is configured to mask the one or more lower-order bits to ensure that the target address of a control flow instruction falls on an aligned byte boundary.

3. The computing device of claim 1, further comprising a secure runtime environment configured to enforce code integrity, control flow integrity, and data integrity for native code executing on the processing element; and
  wherein the secure runtime environment is configured to access a user-level control register, which enables and/or disables the masking mechanism, to enforce target address alignment for control flow instructions in the native code.

4. The computing device of claim 3, further comprising a validation mechanism within the secure runtime environment configured to validate that:
  instructions in the native code are located on aligned byte boundaries;
  control flow instructions in the native code have targets which fall on aligned byte boundaries; and
  instructions in the native code do not configure and/or disable the masking mechanism.

5. The computing device of claim 1, wherein the masking mechanism includes a control register that specifies the one or more bits to be masked.

6. The computing device of claim 5, wherein the masking mechanism is configured to change a granularity of alignment by setting specific bits to be masked in the control register.

7. The computing device of claim 1, wherein the one or more bits which are masked in the target address are masked to zero values.

8. The computing device of claim 1, further comprising a web browser configured to download and execute native code on the processing element.

9. A method for using masking to safely execute native code, comprising:
  receiving the native code to be executed on a processing element;
  executing the native code on the processing element; and
  while executing the native code, using a masking mechanism in the processing element to mask one or more bits of a target address for control flow instructions in the native code to transfer control to a restricted set of aligned byte boundaries in the native code by masking the target address for a subset of control transfer instructions, wherein masking the target address comprises determining whether to mask the target address of a control flow instruction based on at least one of an instruction opcode or a type of address encoding for the control flow instruction.

10. The method of claim 9,
  wherein the masking mechanism includes a control register that specifies the one or more bits to be masked; and
  wherein the method further involves changing a granularity of alignment by setting specific bits to be masked in the control register.

11. The method of claim 10, wherein masking the one or more bits involves masking a limited set of low-order bits in the target address.

12. The method of claim 11,
  wherein receiving the native code involves loading the native code into a secure runtime environment which enforces code integrity, control flow integrity, and data integrity for the native code executing on the processing element; and
  wherein the method further comprises using the secure runtime environment to access a user-level control register, which enables and/or disables the masking mechanism, to enforce target address alignment for control flow instructions in the native code.

13. The method of claim 12, wherein the method further involves validating the native code module to ensure that:
  instructions in the native code module are located on aligned along byte boundaries; and
  a set of instructions in the native code module do not include instructions associated with configuring and/or disabling the masking mechanism.

14. The method of claim 9, wherein the one or more bits which are masked in the target address are masked to zero values.

15. A computer-readable storage medium storing instructions that when executed by a computing device cause the computing device to perform a method for using masking to safely execute native code, the method comprising:
  receiving the native code to be executed on a processing element;
  executing the native code on the processing element; and
  while executing the native code, using a masking mechanism in the processing element to mask one or more bits of a target address for control flow instructions in the native code to transfer control to a restricted set of aligned byte boundaries in the native code by masking the target address for a subset of control transfer instructions, wherein masking the target address comprises determining whether to mask the target address of a control flow instruction based on at least one of an instruction opcode or a type of address encoding for the control flow instruction.

16. The computer-readable storage medium of claim 15,
  wherein the masking mechanism includes a control register that specifies the one or more bits to be masked; and
  wherein the method further involves changing a granularity of alignment by setting specific bits to be masked in the control register.

17. The computer-readable storage medium of claim 16, wherein masking the one or more bits involves masking a limited set of low-order bits in the target address.

18. The computer-readable storage medium of claim 17,
  wherein receiving the native code involves loading the native code into a secure runtime environment which enforces code integrity, control flow integrity, and data integrity for the native code executing on the processing element; and
  wherein the method further comprises using the secure runtime environment to access a user-level control register, which enables and/or disables the masking mechanism, to enforce target address alignment for control flow instructions in the native code.

19. The computer-readable storage medium of claim 18, wherein the method further involves validating the native code module to ensure that:
- instructions in the native code module are located on aligned along byte boundaries; and
- a set of instructions in the native code module do not include instructions associated with configuring and/or disabling the masking mechanism.

20. The computer-readable storage medium of claim 15, wherein the one or more bits which are masked in the target address are masked to zero values.

* * * * *